United States Patent [19]

Titus

[11] Patent Number: 5,636,653
[45] Date of Patent: Jun. 10, 1997

[54] FLUID METERING APPARATUS AND METHOD

[75] Inventor: John S. Titus, Prior Lake, Minn.

[73] Assignee: Perception Incorporated, Prior Lake, Minn.

[21] Appl. No.: 566,019

[22] Filed: Dec. 1, 1995

[51] Int. Cl.$^6$ .................. F16K 21/00; G05D 7/06
[52] U.S. Cl. .................. 137/14; 137/487.5; 137/551
[58] Field of Search .................. 137/14, 487.5, 137/551

[56] References Cited

U.S. PATENT DOCUMENTS

| | | |
|---|---|---|
| 3,725,648 | 4/1973 | Schmick et al. . |
| 4,085,287 | 4/1978 | Kullmann et al. . |
| 4,086,434 | 4/1978 | Bocchi . |
| 4,392,611 | 7/1983 | Bachman et al. . |
| 4,530,463 | 7/1985 | Hiniker et al. . |
| 4,637,547 | 1/1987 | Hiniker et al. . |
| 4,833,618 | 5/1989 | Verma et al. . |
| 4,839,790 | 6/1989 | Fujimoto et al. . |
| 4,866,633 | 9/1989 | Nakane et al. . |
| 4,899,217 | 2/1990 | MacFadyen et al. . |
| 4,918,995 | 4/1990 | Pearman et al. . |
| 4,940,976 | 7/1990 | Gastouniotis et al. . |
| 5,126,934 | 6/1992 | MacFadyen . |
| 5,198,989 | 3/1993 | Petroff . |
| 5,261,276 | 11/1993 | Gifford . |
| 5,327,488 | 7/1994 | Garland . |
| 5,369,598 | 11/1994 | Horiike et al. . |

*Primary Examiner*—Gerald A. Michalsky
*Attorney, Agent, or Firm*—Merchant, Gould, Smith, Edell, Welter & Schmidt, P.A.

[57] ABSTRACT

An apparatus and method for metering fluid flow is disclosed. A fluid dispensing unit is coupled between a supply pipe and a demand pipe, and dispenses fluid received from the supply pipe to the demand pipe. The demand pipe is coupled to one or more fluid-expending appliances. The pressure of the fluid in the demand pipe is monitored by a fluid information unit. The fluid information unit and fluid dispensing unit cooperate to maintain the fluid flowing through the demand pipe at a substantially constant demand fluid pressure by monitoring fluid flowing through the demand pipe and actively dispensing fluid received from the supply pipe into the demand pipe to maintain the demand fluid pressure at a pre-established demand pressure level. The fluid information unit and fluid dispensing unit also cooperate to meter or measure the volume of fluid dispensed through the fluid dispensing unit. The fluid dispensing unit includes a controllable valve responsive to valve control signals produced by the fluid information unit. The volume of fluid dispensed through the valve is computed using the difference between the supply and demand fluid pressures and a duration of time during which the fluid is flowing through the valve. Alternatively, the volume of dispensed fluid is computed using the supply and demand fluid pressure difference and a characteristic duty cycle factor or characteristic flow factor of the valve.

29 Claims, 17 Drawing Sheets

FLUID METERING APPARATUS AND METHOD

FIELD OF THE INVENTION

The present invention relates generally to measuring fluid flow and, more particularly, to a method and apparatus for metering fluid flowing through a fluid delivery system.

BACKGROUND OF THE INVENTION

A wide variety of fluid flow measuring devices have been developed for use in fluid delivery systems in an attempt to accurately determine the volume of the fluid delivered through the delivery system and, more particularly, to the volume of fluid delivered to a particular user of the fluid delivery system. Most natural gas utilities, for example, provide a gas meter at each user location. Such conventional gas meters typically include a diaphragm-type flow sensing apparatus having an accuracy that varies widely as the function of the relative pressure drop across the diaphragm and a number of environmental conditions, such as ambient temperature and relative atmospheric pressure. Such conventional gas meters are typically expensive, bulky, and very difficult to repair and maintain. Moreover, conventional gas and water utility meters require periodic manual reading of the meter in order to determine consumer usage of the fluid over a particular period of time. The manually collected fluid meter information must then be input to a computerized billing system which subsequently issues a bill to the consuming user on a periodic basis.

It can be appreciated that each step in the process of obtaining fluid usage information from a conventional fluid metering device has associated with it inherent inaccuracies due to metering imprecision, changes in mechanical tolerances over the service life of such metering devices, and human-error when reading meter settings and processing meter data. It is well-known in the gas utility community, for example, that such inaccuracies inherent in conventional gas meters can result in overcharging of consumers by as much as two percent above an appropriate billing amount. Considering the vast number of such conventional gas meters currently in service, it can be appreciated that a two percent overcharge occurring each billing cycle over a period of years represents an extremely large surcharge that has traditionally been paid by the consuming public. It is interesting to note that the conventional diaphragm-type gas meter has a design that dates back by more than a century.

A number of electronic metering devices have been developed in an attempt to collect fluid usage data in an automated, efficient manner. U.S. Pat. Nos. 5,126,934, 4,866,633, and 4,839,790, for example, disclose electronic systems for acquiring and interpreting information from a conventional gas meter, determining a flow rate of gas delivered through the conventional gas meter using the acquired information, and then performing various computations and operations using the acquired information. Other gas metering devices, such as those disclosed in U.S. Pat. Nos. 5,369,598 and 4,918,995, for example, employ passive fluid flow sensing apparatuses as improved substitutions for the conventional diaphragm-type gas meters. U.S. Pat. No. 4,940,976, by way of further example, discloses a utility water meter read-out system which purports to acquire water usage information from an existing water meter without requiring any modifications or attachments to the water meter. These and other conventional systems and devices directed to improving the efficiency and convenience of fluid metering suffer from a number of deficiencies resulting from the passive method by which fluid flow rate is typically determined. Such conventional metering devices are referred to herein as passive fluid meters since fluid flow is determined by sensing the fluid as it passes by or through the fluid meter as a sole means for determining fluid flow rate.

It is anticipated that the trend toward deregulation that dramatically impacted the communications industry will very soon affect the quasi-monopolistic gas and water utility industry. De-regulation and privatization of gas and water utilities, for example, will provide an impetus for increased competition for consumer business. Multi-tiered pricing schemes, for example, are currently being used by some utilities to charge users varying rates for gas and water depending on a particular usage. In accordance with such a pricing scheme, essential uses of natural gas, such as for air and water heating, for example, are generally priced at a lower rate than gas used for luxury purposes, such as for heating outdoor pools. Further, it is anticipated that enhanced control over gas and water delivery systems from remote locations will be desirable for providing enhanced service and safety features. It can be appreciated that conventional fluid metering devices and systems cannot be practicably adapted to provide such enhanced functionality, which will certainly be required in a de-regulated competitive utility market.

There exists a need for an improved fluid metering apparatus and method that overcomes the deficiencies inherent in conventional fluid metering schemes. There exists a further need for such a metering system that can provide enhanced safety features currently unavailable when employing fluid metering systems of a conventional design. The present invention fulfills these and other needs.

SUMMARY OF THE INVENTION

The present invention is an apparatus and method for metering fluid flow. A fluid dispensing unit is coupled between a supply pipe and a demand pipe, and dispenses fluid received from the supply pipe to the demand pipe. The pressure of the fluid in the demand pipe is generally lower than the pressure of the fluid in the supply pipe. The demand pipe, in turn, is coupled to one or more fluid-expending appliances. The pressure of the fluid in the demand pipe is monitored by a fluid information unit. The fluid information unit and fluid dispensing unit cooperate to maintain the fluid flowing through the demand pipe at a substantially constant demand fluid pressure by monitoring fluid flowing through the demand pipe and actively dispensing fluid received from the supply pipe into the demand pipe to maintain the demand fluid pressure at a pre-established demand pressure level. The fluid information unit and fluid dispensing unit also cooperate to meter or measure the volume of fluid dispensed through the fluid dispensing unit.

In one embodiment, the fluid dispensing unit includes a controllable valve responsive to valve control signals produced by the fluid information unit. A pressure sensor disposed in each of the fluid dispensing and information units determines the pressure of the fluid in the supply pipe and the demand pipe, respectively. The fluid information unit compares the pressure of the fluid in the demand pipe with a pre-established demand pressure level and, in response to a difference therebetween, transmits a valve control signal to the fluid dispensing unit causing the valve to actuate so as to equilibrate the demand fluid pressure with the pre-established demand pressure level. The volume of fluid flowing through the valve is computed using the pressure difference between the supply and demand fluid pressures and a characteristic flow rate factor of the valve indicative of a known volume of fluid passable through the valve over a known period of time.

In another embodiment, dispensing of supply pipe fluid to the demand pipe is facilitated by employment of a modulating valve disposed in the fluid dispensing unit that is responsive to valve control signal pulses produced by the fluid information unit. The fluid information unit produces a demand pressure error signal representative of a pressure difference between the demand fluid pressure and a pre-established demand pressure level. The modulating valve is cycled between a closed position and an open position in response to valve control signal pulses corresponding to the demand pressure error signal so as to maintain the demand fluid pressure at the pre-established demand pressure level. The demand fluid pressure is sampled and demand pressure error signals are produced at regular intervals in order to compensate for changes between the demand fluid pressure and the pre-established demand pressure level. The volume of fluid dispensed through the modulating valve is computed using the difference between the supply and demand fluid pressures and a duration of time during which the fluid is flowing through the modulating valve. Alternatively, the volume of dispensed fluid may be computed using the supply and demand fluid pressure difference and a characteristic duty cycle factor of the modulating valve, where the characteristic duty cycle factor is associated with a known volume of fluid flowable through the valve over a given period of time. The volume of the fluid flowing through the valve during a pre-established period of time is computed and stored by the fluid information unit for subsequent transmission to a provider of the. fluid to the supply pipe.

In an alternative embodiment, the fluid information unit produces an analog valve control signal which is transmitted to a controllable valve disposed in the fluid dispensing unit to control the rate of fluid flow through the valve. Active dispensing of the fluid from the supply pipe to the demand pipe is effectuated in a manner similar to that described hereinabove, with the exception that the controllable valve disposed in the fluid dispensing unit is responsive to analog valve control signals produced by the fluid information unit.

In accordance with a further embodiment, fluid delivered to a number of fluid-expending appliances is controlled by a demand control unit disposed between the appliance and the fluid information unit. Each of the demand control units includes a pressure sensor for sensing the pressure of the fluid delivered to the appliance, and may additionally include a second pressure sensor for sensing the pressure of the fluid supplied to the demand control unit. The fluid information unit cooperates with each of the demand control units to manage fluid delivery to the plurality of appliances. Fluid usage by each appliance is computed by the corresponding demand control unit.

The fluid metering system communicates fluid usage information to a remotely located provider or managing entity of the fluid delivery system over telephone or other communication means for purposes of billing users of the fluid, and communicates status and anomalous condition information to appropriate responding authorities, such as a utility, fire department, neighbor, relative, or the like. The fluid metering system can further be utilized as a fluid leak detector, and can further be utilized to determine catastrophic as well as minor fluid loss by determining the magnitude of pressure differential across one or more controllable valves incorporated into the fluid metering system.

DETAILED DESCRIPTION OF THE EMBODIMENTS

Figure 1:
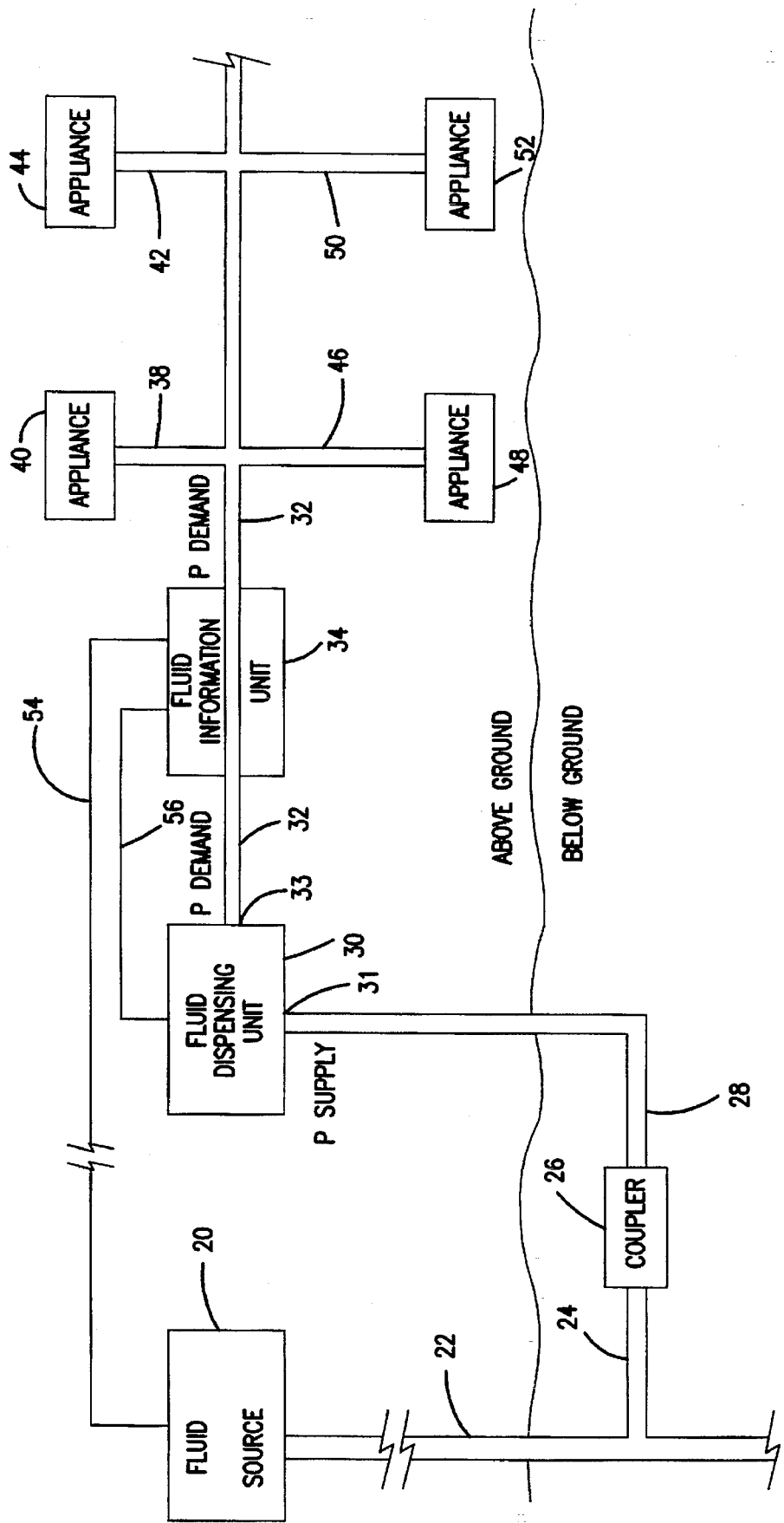
FIG. 1 is a depiction of an embodiment of a fluid metering apparatus in accordance with the present invention.

Referring now to the drawings, and more particularly to FIG. 1, there is illustrated in system block diagram form a system for metering fluid received from a supply pipe and dispensed to a demand pipe. A fluid dispensing unit 30 receives fluid from the supply pipe 28 at an input port 31, and dispenses the fluid to a demand pipe 32 through an output port 33. The pressure of the fluid in the supply pipe 28 is generally at a pressure greater than the pressure of the fluid in the demand pipe 32.

The fluid dispensing unit 30 includes a pressure sensor for sensing the pressure of the fluid in the supply pipe 28, and also includes a controllable valve disposed between the supply pipe 28 and the demand pipe 32. A fluid information unit 34 includes a pressure sensor for sensing the pressure of the fluid in the demand pipe 32, and also includes a processor for coordinating the operation of the fluid dispensing and information units 30 and 34. The fluid information unit 34 communicates with the fluid dispensing unit 30 over a communication line 56 to cooperatively control the flow of fluid from the supply pipe 28 to the demand pipe 32 so as to maintain the pressure of the fluid in the demand pipe 32 at a pre-established demand pressure level. More particularly, the fluid information unit 34 produces valve control signals communicated to the controllable valve disposed in the fluid dispensing unit 30 to equilibrate the pressure of the fluid in the demand pipe 32 with the pre-established demand pressure level as the fluid flows through the demand pipe 32.

In accordance with another embodiment, the functions performed by the fluid dispensing unit 30 and the fluid information unit 34 can be achieved within a single metering unit, rather than by the two remotely located fluid dispensing and fluid information units 30 and 34. In such a configuration, the fluid dispensing unit 30 may be modified to determine the supply fluid pressure in the supply pipe 28 as well as determine the demand fluid pressure in the demand pipe 32. The fluid dispensing unit 30, having incorporated the valve control functionality of the fluid information unit 34 in accordance with this embodiment, produces the valve control signals to control the controllable valve to equilibrate the pressure of the fluid in the demand pipe 32 with the pre-established demand pressure level as the fluid flows through the demand pipe 32. The fluid dispensing unit 30 then computes the volume of fluid flowing through the controllable valve.

Returning to the embodiment depicted in FIG. 1, a number of appliances 40, 44, 48, and 52 are coupled to the demand pipe 32 and expend fluid from the demand pipe 32 on a selective or continuous basis. As the appliances expend the fluid received from the demand pipe 32, the fluid information unit 34 senses a change in the pressure in the demand pipe 32 and, in response, produces and transmits a valve control signal to the fluid dispensing unit 30. In response to the valve control signal, a controllable valve disposed in the fluid dispensing unit 30 is actuated so as to modify the flow of fluid therethrough to offset the change in demand pipe 32 pressure. Closed-loop monitoring and dispensing of the fluid through the controllable valve provide for a relatively constant pressure of the fluid in the demand pipe 32 and at each of the appliances 40, 44, 48, and 52 coupled to the demand pipe 32. It is to be understood that the fluid metering apparatus and method described herein can be advantageously employed to accurately meter delivery of various types of fluid, including fluids in a gaseous or liquid phase.

An important advantage realized through employment of the fluid metering system illustrated in FIG. 1 concerns the significant increase in fluid metering accuracy over conventional fluid metering approaches. As described previously in the Background of the Invention, conventional fluid metering schemes are typically directed toward passively determining a flow rate of fluid delivered through a service pipe. Such passive metering approaches generally provide only a limited amount of usage information, are susceptible to varying degrees of inaccuracy, and are often expensive and difficult to repair and maintain.

In stark contrast to conventional passive metering techniques, the fluid metering apparatus illustrated in FIG. 1 provides for active dispensing of a fluid supplied through a supply pipe and delivered to a demand pipe to which one or more fluid-expending appliances are coupled. Monitoring of the demand fluid pressure by the fluid information unit 34 and controlled regulation of the fluid passing through the fluid dispensing unit 30 provides for a high degree of control of the fluid flowing through the demand pipe 32 and a high degree of accuracy with respect to measuring or metering fluid flow through the demand pipe 32.

Figure 2:
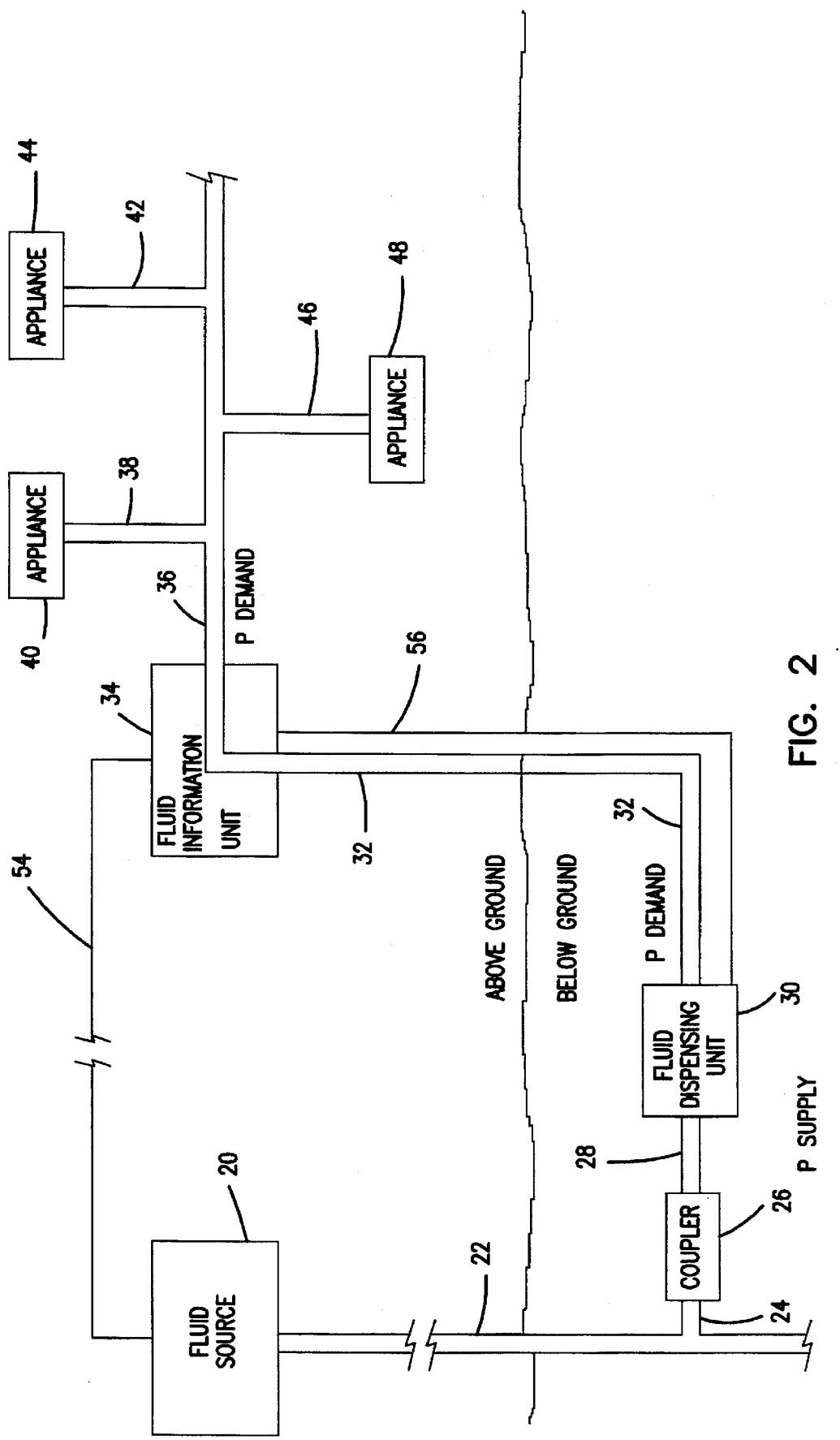
FIG. 2 is another embodiment of a fluid metering apparatus in accordance with the present invention.
Figure 10:
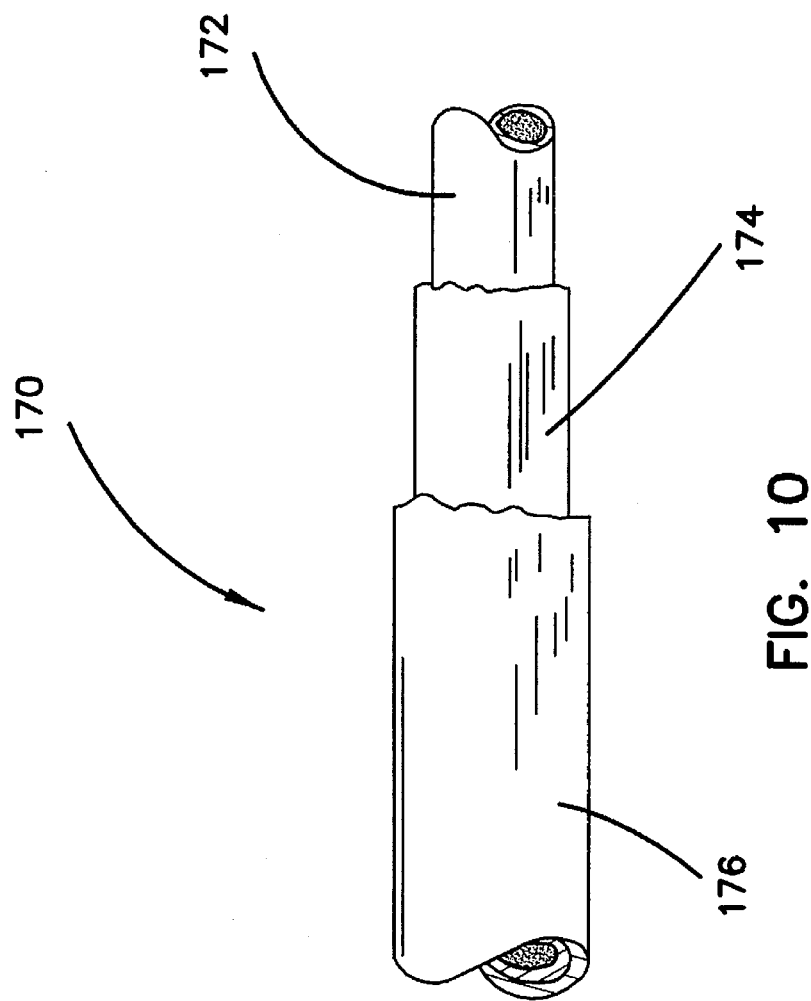
FIG. 10 is a side plan view of a service conduit for communicating information signals, power signals, and fluid between a fluid dispensing unit and a fluid information unit.
Figure 11:
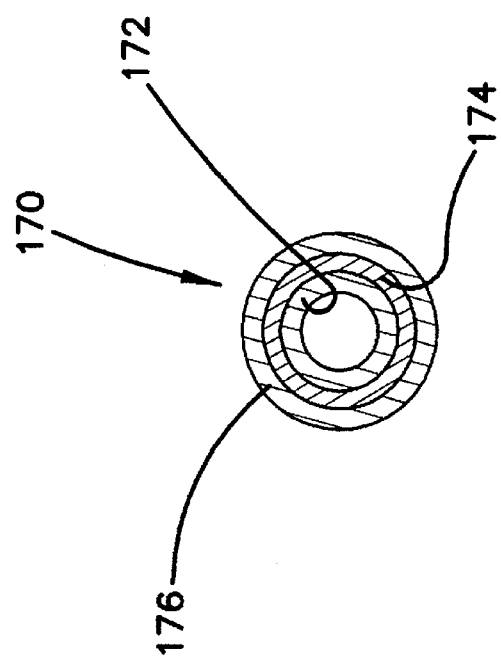
FIG. 11 is a cross-sectional view of the service conduit illustrated in FIG. 10.

The embodiment illustrated in FIG. 1 represents one configuration of a fluid metering apparatus in accordance with the present invention in which both the fluid dispensing unit 30 and the fluid information unit 34 are located above ground level. The configuration depicted in FIG. 1 is particularly well-suited for use when retrofitting existing fluid delivery systems in situations where accessing underground pipes and conduits is difficult or undesirable. In FIG. 2, there is illustrated an embodiment of a fluid metering apparatus in accordance with the present invention in which the fluid dispensing unit 30 is installed below ground level. The configuration depicted in FIG. 2 is particularly well-suited for use in newly installed systems in which access to below ground fluid supply lines and conduits is convenient. Power and control signals are preferably communicated between the fluid information unit 34 and the fluid dispensing unit 30 over a communication line 56, which is preferably protected within a conduit suitable for use in an underground environment. One such suitable service conduit, for example, is illustrated in FIGS. 10–11, which will be discussed in detail hereinbelow.

Figure 3:
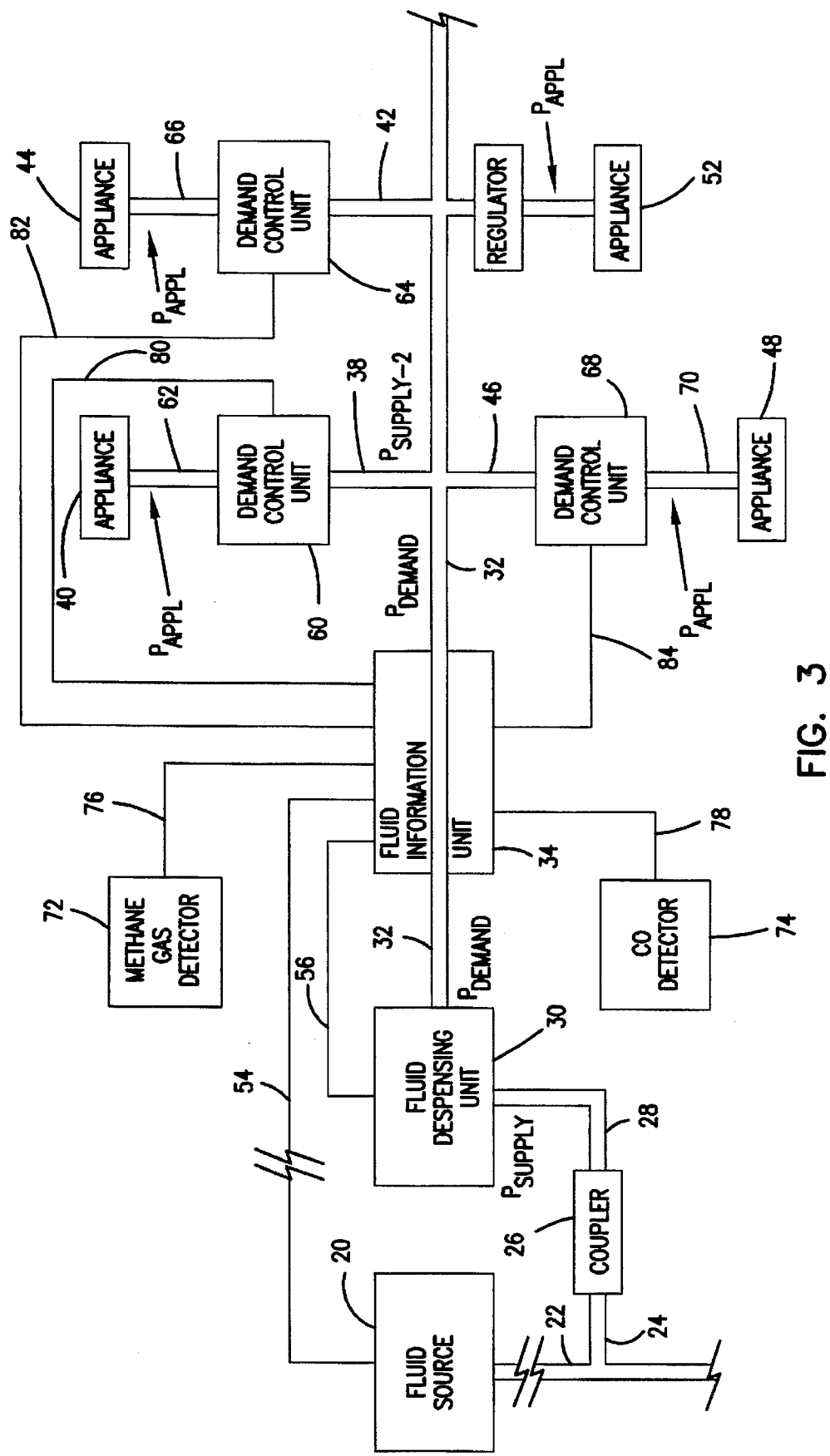
FIG. 3 is a further embodiment of a fluid metering apparatus in accordance with the present invention.
Figure 4:
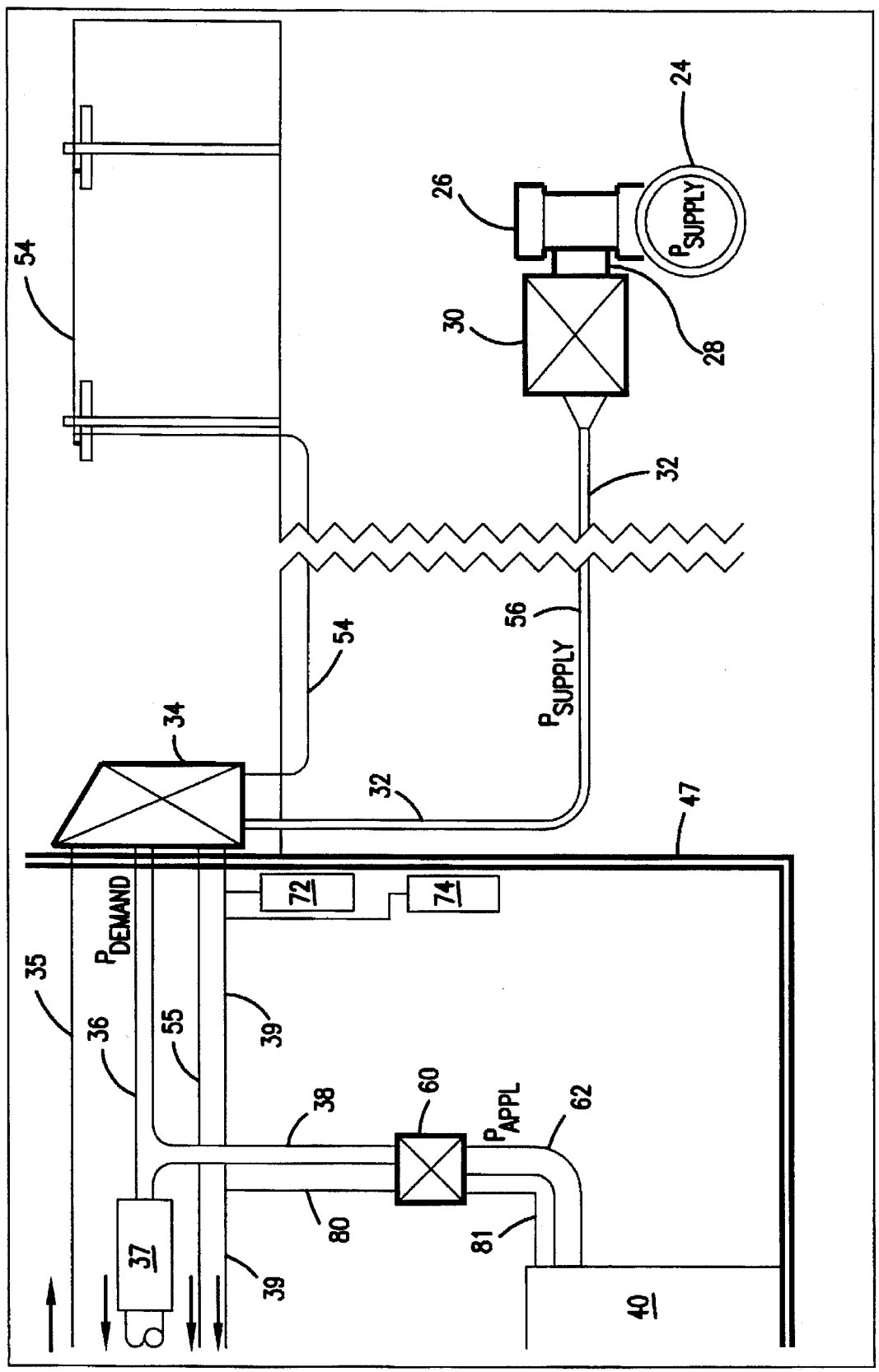
FIG. 4 is a depiction of one embodiment of a fluid metering device in accordance with the present invention configured for use in a building or dwelling.

Turning now to FIGS. 3 and 4, there is illustrated another embodiment of a fluid measuring apparatus in accordance with the present invention which includes a fluid dispensing unit 30 coupled to a supply pipe 28, a fluid information unit 34 coupled to the fluid dispensing unit 30 through a demand pipe 32, and a plurality of demand control units 60, 64, and 68 each coupled to corresponding appliances 40, 44, and 48 and the demand pipe 32. In accordance with this illustrative embodiment, the fluid dispensing unit 30 regulates fluid received from the supply pipe 28 at a supply fluid pressure $P_{SUPPLY}$ to a demand pipe 32 so as to maintain the demand fluid pressure $P_{DEMAND}$ at a relatively constant demand fluid pressure. Each of the demand control units 60, 64, and 68 receives fluid from the demand pipe 32 at the demand fluid pressure $P_{DEMAND}$ and controls fluid flow through a controllable valve so as to maintain the pressure of the fluid delivered to the appliances 40, 44, and 48 at a relatively constant appliance fluid pressure $P_{APPL}$. It is noted that the demand fluid pressure $P_{DEMAND}$ is further denoted in FIG. 3 as $P_{SUPPLY-2}$, since this pressure represents the pressure of the fluid in the demand pipe 32 applicable at the input ports to the demand control units 60, 64, and 68.

For purposes of illustration, and not of limitation, it is assumed that the fluid flowing through the fluid delivery system illustrated in FIGS. 3 and 4 is natural gas, and that the appliances 40, 44, 48, and 52 are natural gas consuming appliances. It is further assumed that the pressure $P_{SUPPLY}$ of the natural gas supplied to the fluid dispensing unit 30 varies between 10 and 60 pounds per square inch (PSI) depending on various systemic and environmental conditions. The fluid dispensing unit 30 regulates the flow of the gas through a controllable valve provided therein to maintain the gas flowing into the demand pipe 32 at a pre-established demand pressure level $P_{ESTAB}$. As discussed previously with respect to FIGS. 1–2, the fluid information unit 34 detects changes in fluid pressure within the demand pipe 32, compares the detected demand fluid pressure $P_{DEMAND}$ to a pre-established demand pressure level $P_{ESTAB}$, and transmits a valve control signal to the fluid dispensing unit 30 over a communication line 56 to modify the flow rate of gas through the fluid dispensing unit 30.

Each of the demand control units 60, 64, and 68 is coupled to the demand pipe 32 through respective appliance pipes 38, 42, and 46, and to corresponding gas consuming appliances 40, 44, and 48. Each of the demand control units includes a controllable valve for regulating gas flow from the demand pipe 32 to its respective appliance. The fluid information unit 34 cooperates with each of the demand control units 60, 64, and 68 to maintain a relatively constant appliance pressure $P_{APPL}$ in appliance pipes 62, 66, and 70. In one embodiment, the fluid dispensing unit 30 and fluid information unit 34 cooperate to maintain the pressure $P_{DEMAND}$ of the gas in the demand pipe 32 at 2 PSI. Further, the fluid information unit 34 cooperates with each of the demand control units 60, 64, and 68 to maintain the pressure $P_{APPL}$ of the gas in appliance pipes 62, 66, and 70 at approximately 7 inches water column (7" WC). Each of the demand control units 60, 64, and 68 includes a pressure sensor for sensing the pressure $P_{APPL}$ of the gas in respective appliance pipes 62, 66, and 70, and may additionally include a second pressure sensor for sensing the pressure $P_{DEMAND}$ of the gas in the pipes 38, 42, and 46 branching from the demand pipe 32.

In accordance with the embodiment illustrated in FIGS. 3 and 4, accurate metering of gas supplied through the fluid dispensing unit 30 and delivered to individual gas-consuming appliances can be effectuated by use of a demand control unit in cooperation with the fluid information unit 34. The ability to determine gas usage by specific appliances is particularly important when exploiting the advantages offered through use of a multi-tiered gas delivery pricing scheme. By way of example, many providers of natural gas employ a multi-tiered pricing scheme under which the price of gas varies depending on its particular use. In accordance with such a pricing scheme, gas used for heating interior buildings and water is typically considered a necessary use. In contrast, gas used for heating outdoor pool water is generally not considered an essential or necessary use, and as such, is more costly to the consumer than gas required for essential uses. The volume of gas consumed by appliances 40, 44, and 48 is accurately determined by the demand control units 60, 64, and 68, respectively.

The gas usage data for individual appliances may be stored in its respective demand control unit or by the fluid information unit 34. Gas consumption data for particular appliances and for system-wide usage is preferably transmitted on a regular basis to a provider or a managing entity of the natural gas over a communication line 54. The fluid metering system thus eliminates the need to manually collect gas consumption information from individual users and input the manually collected data into a billing system prior to issuing a bill to each of the users.

As further illustrated in FIGS. 3 and 4, the fluid information unit 34 receives information from methane gas detector 72 and carbon monoxide detector 74. These and other safety detectors may be distributed throughout a household or other building for purposes of detecting the presence of toxic gases and substances. Such detectors are generally activated upon detecting a specific toxin present at a particular concentration. Upon activation, the methane gas detector 72 and carbon monoxide detector 74 transmit an activation signal to the fluid information unit 34 through communication lines 76 and 78, respectively. In response to an activation signal, the fluid information unit 34 preferably establishes communication with an appropriate responding authority and transmits information regarding the potentially dangerous condition, such as the location of the dwelling and other pertinent information.

Figure 5:
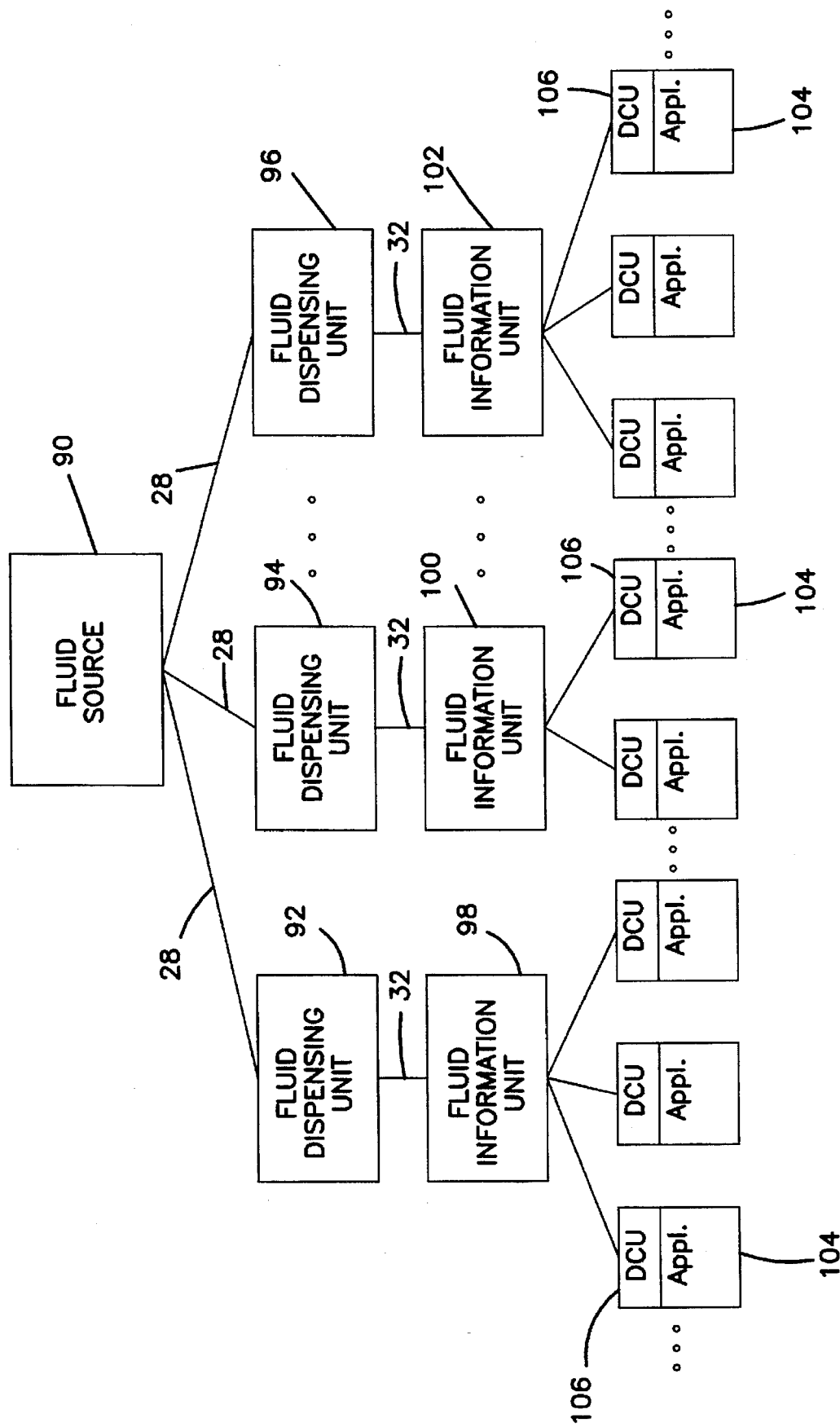
FIG. 5 is a depiction of a distributed fluid metering system in accordance with the present invention.

Referring now to FIG. 5, there is illustrated in system block diagram form a fluid delivery system including a fluid source 90 from which fluid is delivered to a plurality of dispensing units 92, 94, and 96. It is to be understood that the dispensing units may be individually provided at remote locations or, alternatively, at a single location, such as a university campus or other relatively large building complex. Associated with the fluid dispensing units 92, 94, and 96 are respective fluid information units 98, 100, and 102, which, in turn, are coupled to a plurality of fluid-expending appliances 104 controlled by respective demand control units (DCU) 106. It is to be further understood that the appliances and demand control units illustrated in FIG. 5 are identified using non-unique reference numerals for purposes of discussion only, and does not imply that the appliances are equivalent in function or purpose.

A significant advantage of the fluid metering apparatus and method of the present invention concerns the ability to control and accurately measure delivery of fluid from a fluid source 90 to a multiplicity of user locations. It is noted that the fluid source 90 may represent a utility, a distribution sub-station, or one or more gas or water mains, for example. More particularly, the metering system depicted in FIG. 5 provides for selective delivery of source fluid, such as natural gas, liquified gas, or water, to any of a number of remote sites. Delivery of such fluids to particular appliances can be controlled locally by the individual fluid dispensing units 92, 94, and 96, and remotely by the managing entity of the fluid source 90. By way of example, it is assumed that the distributed system illustrated in FIG. 5 represents a municipal utility that provides natural gas to a plurality of residential homes each having a fluid dispensing unit, a fluid information unit, and a plurality of gas-consuming appliances coupled to respective demand control units.

It is assumed for purposes of this illustrative example that dispensing and metering of natural gas supplied through the gas main 28 to each of the households is coordinated in a manner substantially similar to that described previously with respect to FIG. 3. Under certain circumstances, it may be desirable to selectively control the delivery of natural gas to certain essential appliances during periods in which gas availability is limited and demand is relatively high, such as during a prolonged period of extremely low temperatures or during a period of limited availability due to a broken gas main 28 or operational failure at the fluid source 90. In such situations, a fluid source provider or managing entity may transmit valve control signals to selected demand control units 106 and appliances 104 for purposes of reducing or eliminating gas flow to the appliance 104. In addition, valve control signals may be transmitted to selected fluid dispensing units to prevent gas from passing through the controllable valve disposed in the fluid dispensing unit, such as when maintenance to a gas main 28 to the fluid dispensing unit is required or an anomalous gas flow condition within a particular household is detected. Advantageous load management of gas or other fluids through a fluid delivery system can be effected by employment of the fluid metering apparatus and method of the present invention.

Figure 6:
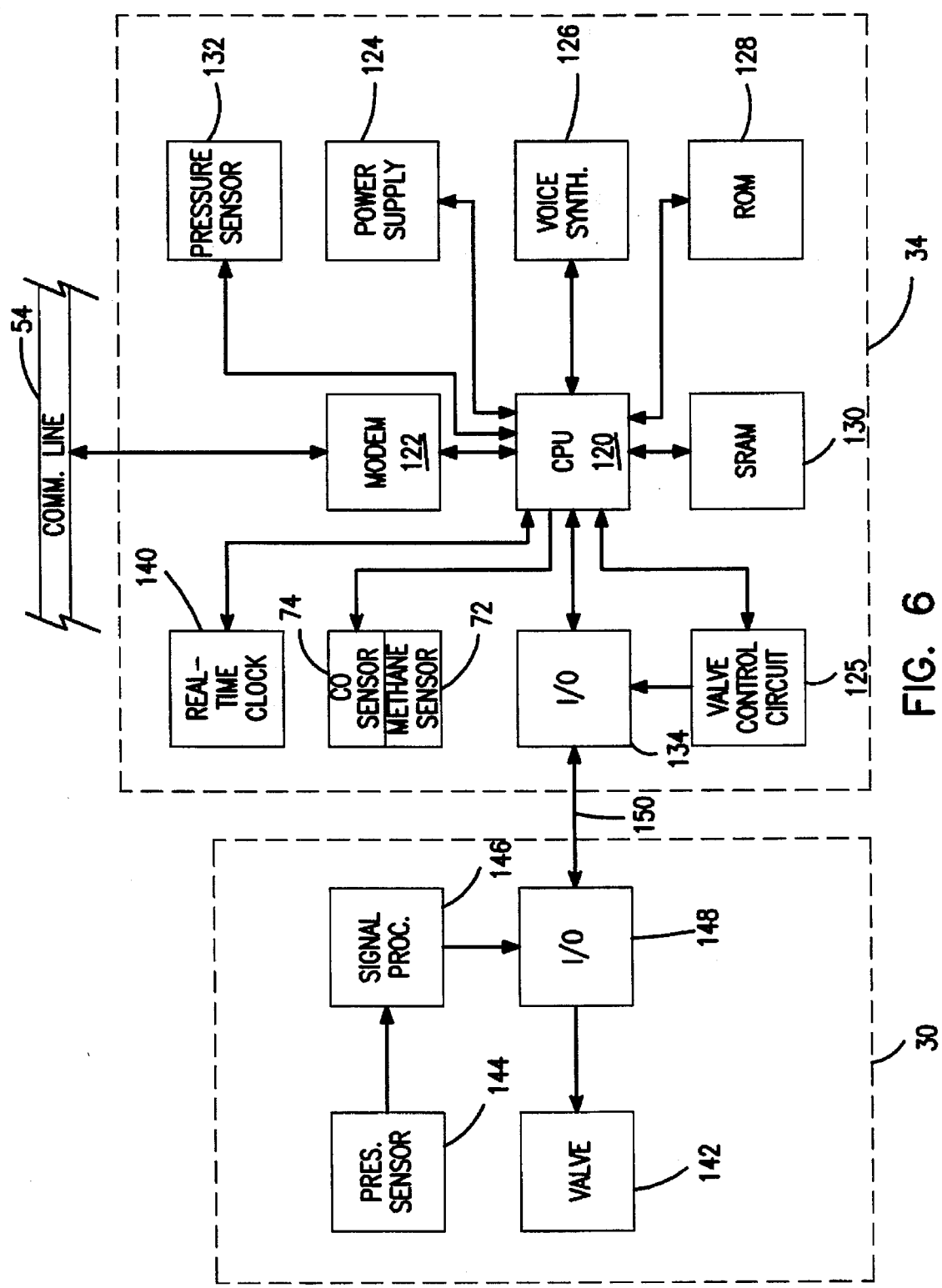
FIG. 6 is a system block diagram of a fluid dispensing unit and a fluid information unit employed in a fluid metering apparatus in accordance with the present invention.

Referring now to FIG. 6, there is illustrated an embodiment of a fluid metering system including a fluid dispensing unit 30 and a fluid information unit 34. As discussed previously, the fluid dispensing unit 30 is coupled to a supply pipe 28 and may be installed above or below ground level. The fluid dispensing unit 30 includes a controllable valve 142, a pressure sensor 144, a signal processor 146 coupled to the pressure sensor 144, and input/output (I/O) circuitry 148. Information and power signals are communicated between the input/output circuitry 148 of the fluid dispensing unit 30 and the input/output circuitry 134 of the fluid information unit 34 over a communication channel 150. The fluid information unit 34 includes a processor or central processing unit (CPU) 120 which coordinates the operation of the fluid information unit 34, the fluid dispensing unit 30, and communication of information and control signals transmitted and received over a communication line 54, such as a telephone or network communication line. Firmware operated on by the processor 120 is stored in a read-only memory (ROM) 128. The processor 120 has access to on-board or external static random-access memory (SRAM) 130 which is utilized when executing program instructions embodied in the firmware and when processing information acquired from the fluid dispensing unit 30 and various sensors and other components that communicate signals to the processor 120.

A demand pressure sensor 132 senses the pressure $P_{DEMAND}$ in the demand pipe 32 and communicates signals representative of the demand fluid pressure $P_{DEMAND}$ to the processor 120. Supply fluid pressure $P_{SUPPLY}$ information is produced by the supply pressure sensor 144 of the fluid dispensing unit 30 and communicated to the processor 120 over the communication line 150. In response to a change in the demand fluid pressure $P_{DEMAND}$ from a pre-established demand pressure level $P_{SUPPLY}$ stored in ROM 128, the processor 120 produces valve control signals which are transmitted to the controllable valve 142 over the communication line 150 to effect a corresponding change in fluid flow through the valve 142 in order to offset the demand fluid pressure change.

The processor 120 also receives signals from various safety sensors, including a carbon monoxide sensor 74 and a methane gas sensor 72. A real-time clock 140 provides current time and date information to the processor 120 for purposes of associating metered fluid usage data with a relevant period of time. The date and time stamped fluid usage data is communicated through a modem 122 to a communication line 54 for subsequent reception by a provider or managing entity of the fluid source 90. A voice synthesis circuit 126 is coupled to the processor 120 for generating verbal messages which may be communicated to a remote location through the modem 122. A power supply 124 provides power to the analog and digital components provided in the fluid information unit 34 and the fluid dispensing unit 30. A valve input circuit 125, in response to control signals produced by the processor 120, produces appropriate valve control signals for actuating the controllable valve 142.

Referring now to FIGS. 10 and 11, and with reference to the embodiment illustrated in FIG. 2, a unique service conduit 170 may be employed for communicating information signals, power signals, and fluid between the fluid dispensing unit 30 and the fluid information unit 34. The service conduit 170 includes a fluid-carrying pipe 172, a power control layer 174 of electrically conductive material used to carry high-voltage electric power, and an outer protective plastic sheath 176 which protects and insulates power control layer 174. In one embodiment, power control layer 174 includes aluminum foil wrapped around the fluid-carrying pipe 172. Alternatively, the power control layer 174 can be constructed from conductive wire mesh embedded in the outer surface of the fluid-carrying pipe 172. The power control layer 174 carries high voltage, low-current electric power for the purpose of preventing rodents and other ground-dwelling animals and insects from chewing into the power control layer 174 and fluid-carrying pipe 172. It is noted that the fluid-carrying pipe 172 is preferably fabricated from plastic material, such as polyethylene (PE).

Further, damage to a particular portion of the power control layer 174 can be detected by detecting changes in the power carrying characteristics of the power control layer 174. The service conduit 170 can further include low voltage power lines and information communication lines (not shown) for the purpose of communicating power and information signals between the fluid information unit 34 and the fluid dispensing unit 30.

Figure 7:
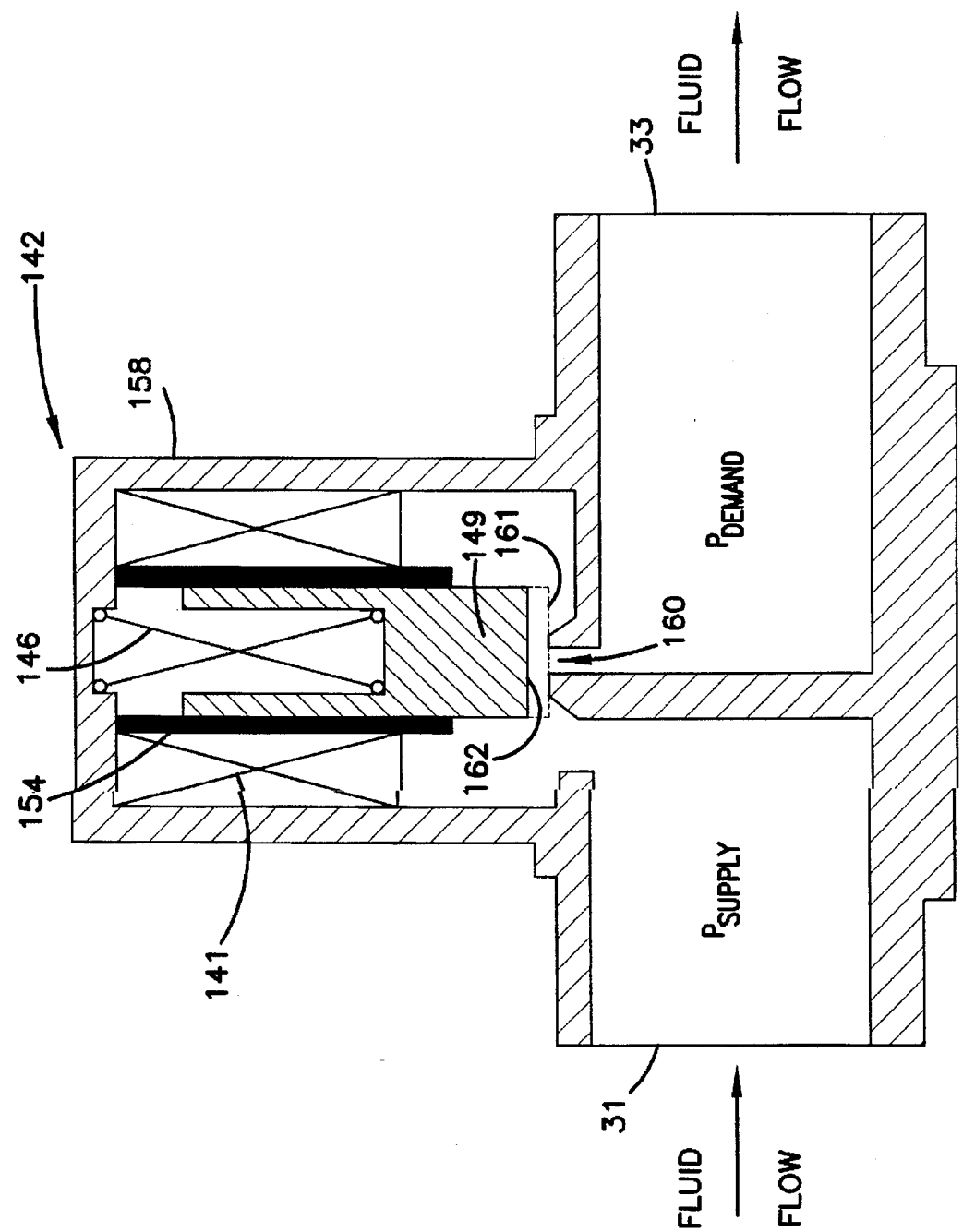
FIG. 7 is a cross-sectional view of a controllable valve suitable for use in the fluid dispensing unit illustrated in FIG. 6.

With reference to FIG. 7, there is illustrated one embodiment of a controllable valve 142 suitable for use in the fluid dispensing unit 30 for purposes of regulating fluid flowing between the supply pipe 28 and the demand pipe 32. The valve 142 illustrated in FIG. 7 is a solenoid-operated valve which is cycled between a closed position 161, indicated as dashed lines, and an open position 162 for regulating the rate of fluid flow through the valve 142 and into the demand pipe 32. Regulation of fluid flow through the valve 142 is accomplished by selectively preventing and permitting fluid flow though an orifice 160. The fluid pressure drop across the orifice 160 is achieved by the valve 142 to reduce the supply fluid pressure $P_{SUPPLY}$ from a relatively high pressure to a lower demand fluid pressure $P_{DEMAND}$ relative to the supply fluid pressure $P_{SUPPLY}$. The valve 142 includes a generally T-shaped housing 158 to which a coupler 26 (not shown in FIG. 7), such as a tapping tee, is connected to an inlet port 31 of the housing 158. The demand pipe 32 is connected to the valve 142 at an outlet port 33 of the housing 158.

A movable plunger or valving member 149, supported in a guide bushing 154, operates between open and closed positions 162 and 161 to control the flow of fluid through the orifice 160. The guide bushing 154 is disposed between the plunger 149 and solenoid coils 141. The solenoid coils 141 are energized in response to a valve control signal to control the movement of the plunger 149. It is important to note that when the solenoid coils 141 are purposefully or unintentionally de-energized, a coil spring 146 or other biasing structure automatically biases the movable plunger 149 to the closed position 161, thereby blocking the flow of fluid through the orifice 160. It is to be understood that other types of controllable orifice valves can be used to control the flow of fluid between the supply pipe 28 and the demand pipe 32.

The controllable valve 142 depicted in FIG. 7 exhibits a characteristic duty cycle factor which is preferably used by the fluid information unit 34 when computing the volume of fluid dispensed through the controllable valve 142 of the fluid dispensing unit 30. The valve depicted in FIG. 7 includes an orifice 160 having a fixed configuration. As such, variations in the rate of fluid flow through the orifice 160 at corresponding varying pressure drops across the orifice 160 can be tabulated and stored in a memory provided in the fluid information unit 34. The volume of fluid dispensed through the valve 142 may be determined using the pressure drop across the orifice 160 multiplied by the characteristic duty cycle factor for a pre-established period of time.

In accordance with an embodiment employing a controllable valve having a variable orifice, in contrast to a fixed orifice 160, such a valve exhibits a characteristic flow rate factor that can be used together with the pressure drop across the orifice 160 to compute the volume of fluid dispensed through the valve 142. The characteristic flow rate of fluid flowable through the variable orifice 160 can be determined at varying orifice configurations and tabulated for varying pressure drops across the orifice 160. One exemplary variable orifice is referred to in the art as a tapered plunger type orifice which is suitable for use in accordance with this embodiment. The change in orifice configuration can be transduced and correlated to a corresponding flow rate at the applicable pressure differential across the orifice 160 and for a pre-established period of time in order to compute the volume of fluid dispensed through the orifice 160. For example, the displacement of the tapered plunger or other fluid regulating member can be transduced and correlated with corresponding flow rate information characteristic of the orifice 160. This flow rate information can be used together with the pressure drop across the orifice 160 for a sampling duration of time to compute the volume of fluid dispensed through the variable orifice 160.

Figure 8:
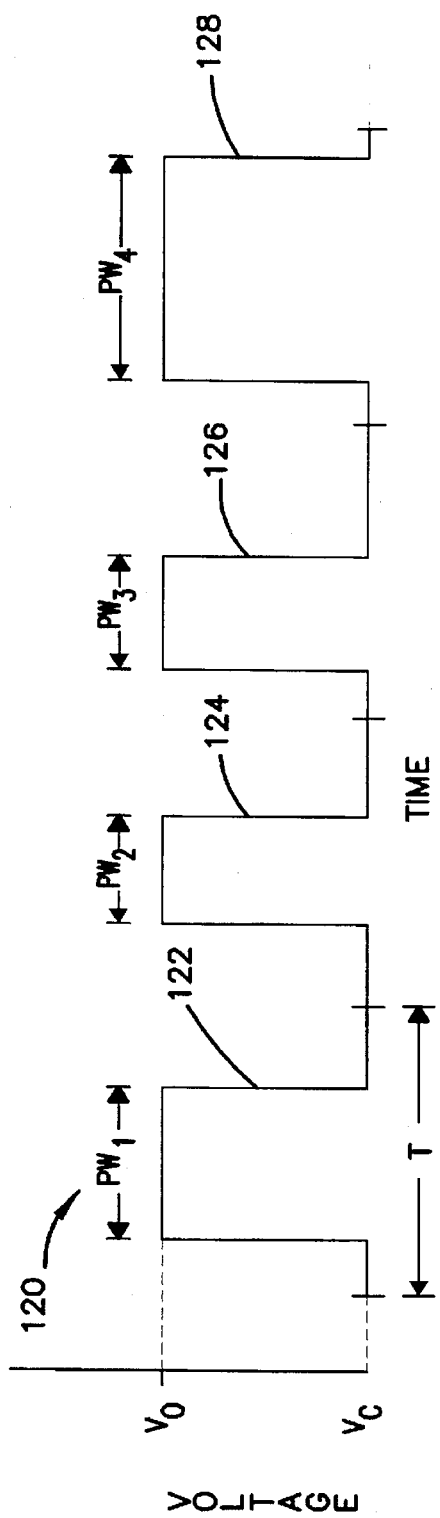
FIG. 8 is an illustration of a pulse train constituting a valve control signal for controlling a controllable valve.
Figure 9:
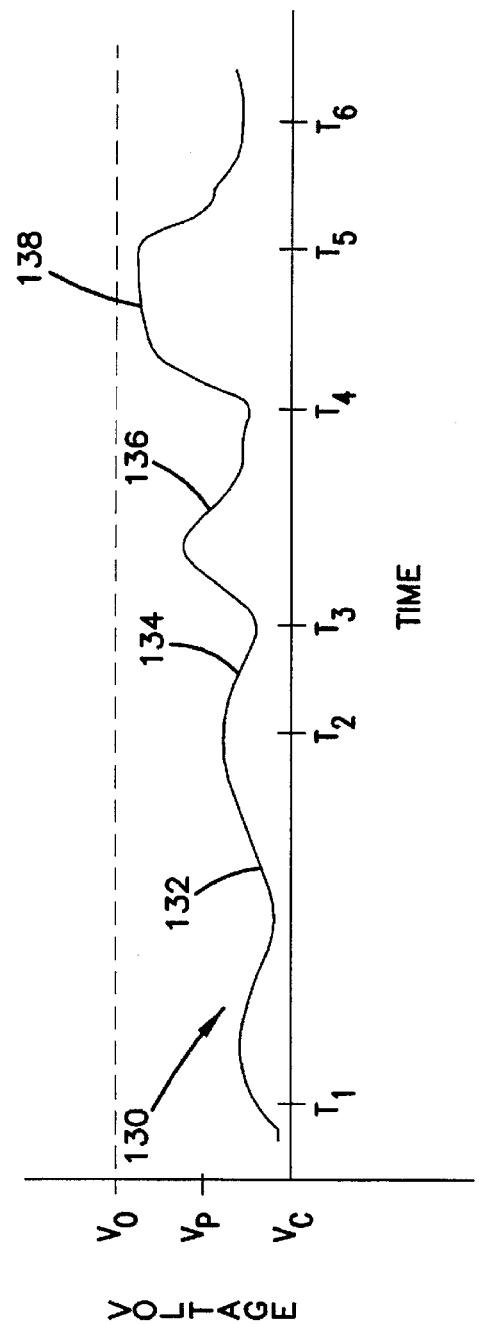
FIG. 9 is a depiction of an analog valve control signal for controlling a controllable valve.

Referring now to FIGS. 8 and 9, and the embodiment illustrated in FIG. 6, there is respectively illustrated a digital and an analog valve control signal produced by the fluid information unit 34 and communicated to the fluid dispensing unit 30 for controlling actuation of the controllable valve 142. The processor 120 of the fluid information unit 34 receives a demand pressure signal from the demand pressure sensor 132 and compares the demand pressure signal with a pre-established demand pressure signal stored in the ROM 128. The processor 120 produces a demand pressure error signal representative of the pressure difference between the demand fluid pressure $P_{DEMAND}$ and the pre-established demand pressure level $P_{ESTAB}$. The processor 120 transmits the demand pressure error signal to the valve control circuit 125 which, in turn, produces a valve control signal which is then communicated to the controllable valve 142 over the communication line 150.

In the embodiment illustrated in FIG. 8, the valve control signal produced by the valve control circuit 125 is a pulse-width-modulated valve control signal 120. In one embodiment, the processor 120 operates on a duty cycle of 100 milliseconds (ms) during which the demand fluid pressure $P_{DEMAND}$ is sampled and compared to the pre-established demand pressure level, the demand pressure error signal is produced and communicated to the valve control circuit 125, which, in turn, produces the valve control signal pulse which is then communicated to the valve 142. The width of a particular valve control signal pulse is proportional to the demand pressure error signal produced by the processor 120. In general, a larger demand pressure error signal represents a larger pressure difference between the demand fluid pressure $P_{DEMAND}$ and the pre-established demand pressure level $P_{ESTAB}$. Accordingly, larger demand pressure error signals are associated with proportionately longer valve control signal pulses.

The pulse width $PW_1$ 122, for example, is longer in time duration than the pulse width $PW_2$ 124. As such, the plunger 149 of the controllable valve 142 will remain in an open position for a greater period of time in response to the pulse width $PW_1$ 122 as compared to pulse width $PW_2$ 124. It is noted that the plunger 149 of the controllable valve 142 generally returns to the closed position for the duration of time between adjacent valve control signal pulses.

In general, a controllable valve responsive to valve control signal pulses, such as the valve 142 illustrated in FIG. 7, incorporates a solenoid coil assembly 141 which includes electromagnetic elements that exhibit various magnetic characteristics specific to the particular valve. One such characteristic that affects the responsiveness of the valve 142 to valve control signal pulses include the rate at which residual magnetism can be dissipated from the electromagnetic elements of the solenoid coil assembly 141. The rate of residual magnetic flux dissipation affects the rate at which the plunger 149 can respond to the pulse-width-modulated valve control signals. The control duty cycle of the processor 120 should be selected to accommodate the mechanical, electro-mechanical, and other environmental considerations that affect the performance of a controllable valve 142 suitable for use in the fluid dispensing unit 30.

In FIG. 9, an analog valve control signal is illustrated in which the control voltage applied to an analog control valve 142 varies as a function of time. In contrast to the control pulse train depicted in FIG. 8, the valve control circuit 125 may instead produce an analog or continuous valve control signal in response to demand pressure error signals produced by the processor 120. The magnitude of the analog valve control signal 130 at a particular time T is representative of the magnitude of the demand pressure error signal and the degree to which the controllable valve 142 is to be actuated in either the open or closed positions. By way of example, the slowly varying valve control signal defined between $T_1$ and $T_3$ indicates moderate to low changes in the actual demand fluid pressure $P_{DEMAND}$ as compared to the pre-established demand pressure level $P_{ESTAB}$. During a period of time defined between $T_4$ and $T_5$, a measurable increase in the amplitude of the valve control signal is indicative of an increased demand pressure error signal, which is followed by a rapid decrease in the magnitude of the demand pressure error signal at $T_5$. Those skilled in the art will appreciate that various schemes for controlling the controllable valve 142 between an open and a closed position can be implemented to effect corresponding changes in the flow of fluid through the valve 142 in response to the demand pressure error signals produced by the processor 120.

Turning now to FIGS. 12–15, there is illustrated in schematic diagram form one embodiment of a fluid metering apparatus in accordance with the present invention. The processor 120 coordinates the operations of the fluid information unit 34 as well as those performed by the fluid dispensing unit 30. Integrated circuit component 135 includes serial communication ports, control lines, and power lines for communicating control, information, and power signals between the fluid information unit 34 and fluid dispensing unit 30. The processor 120 communicates with the fluid dispensing unit 30 by transmitting various information and power signals through input/output circuitry 134. A communications integrated circuit component 137 includes modem 122 and voice synthesis circuitry 126 which provide for communication of fluid metering information and verbal warn and status information over the communication line 54.

Figure 12:
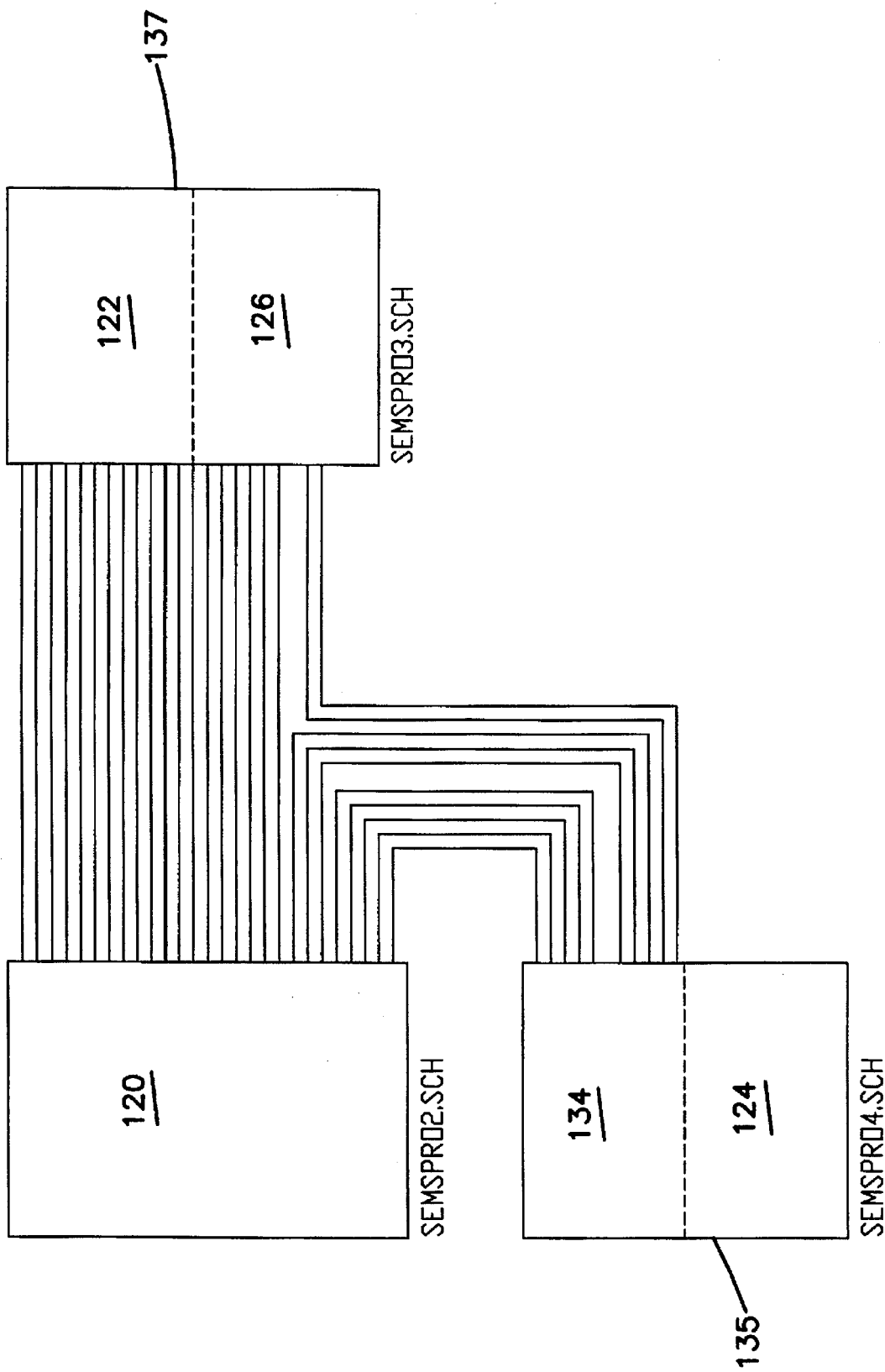
FIGS. 12–15 are schematic diagrams of various components and interconnections therebetween comprising a fluid dispensing unit and fluid monitoring unit in accordance with one embodiment of the present invention.
Figure 13:
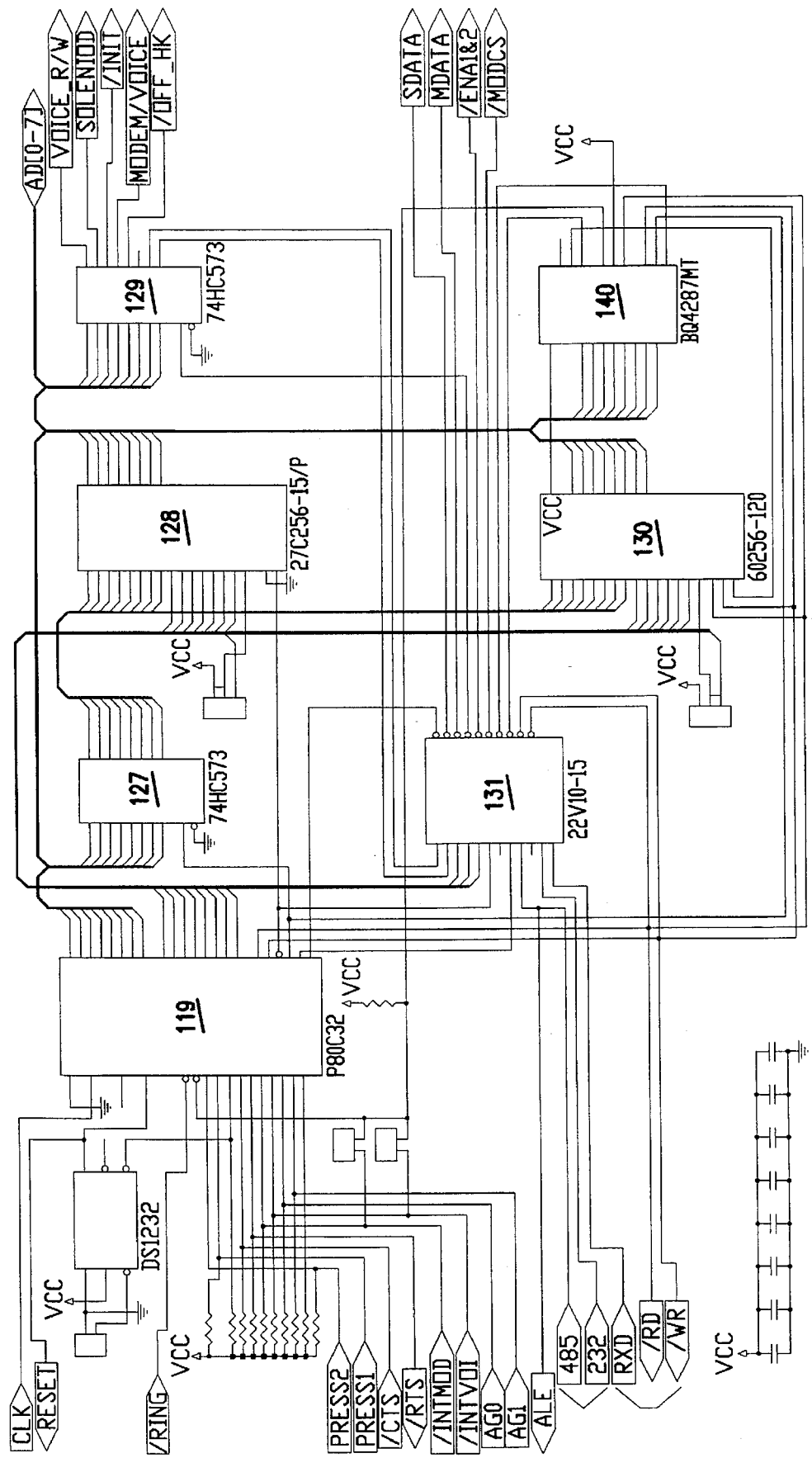

Referring now to FIG. 13, there is illustrated in detail the components and interconnections that comprise the processor and memory circuit 120 illustrated in FIG. 12. A microcontroller 119 cooperates with static random-access-memory (SRAM) 130 programmable read-only-memory (PROM) 128, control register 129, and address demultiplexer 127 to coordinate the operation of the fluid information unit 34 and the fluid dispensing unit 30. A real-time clock 140 provides time and date information to the microcontroller 119 for purposes of time and date stamping fluid metering data.

Figure 14:
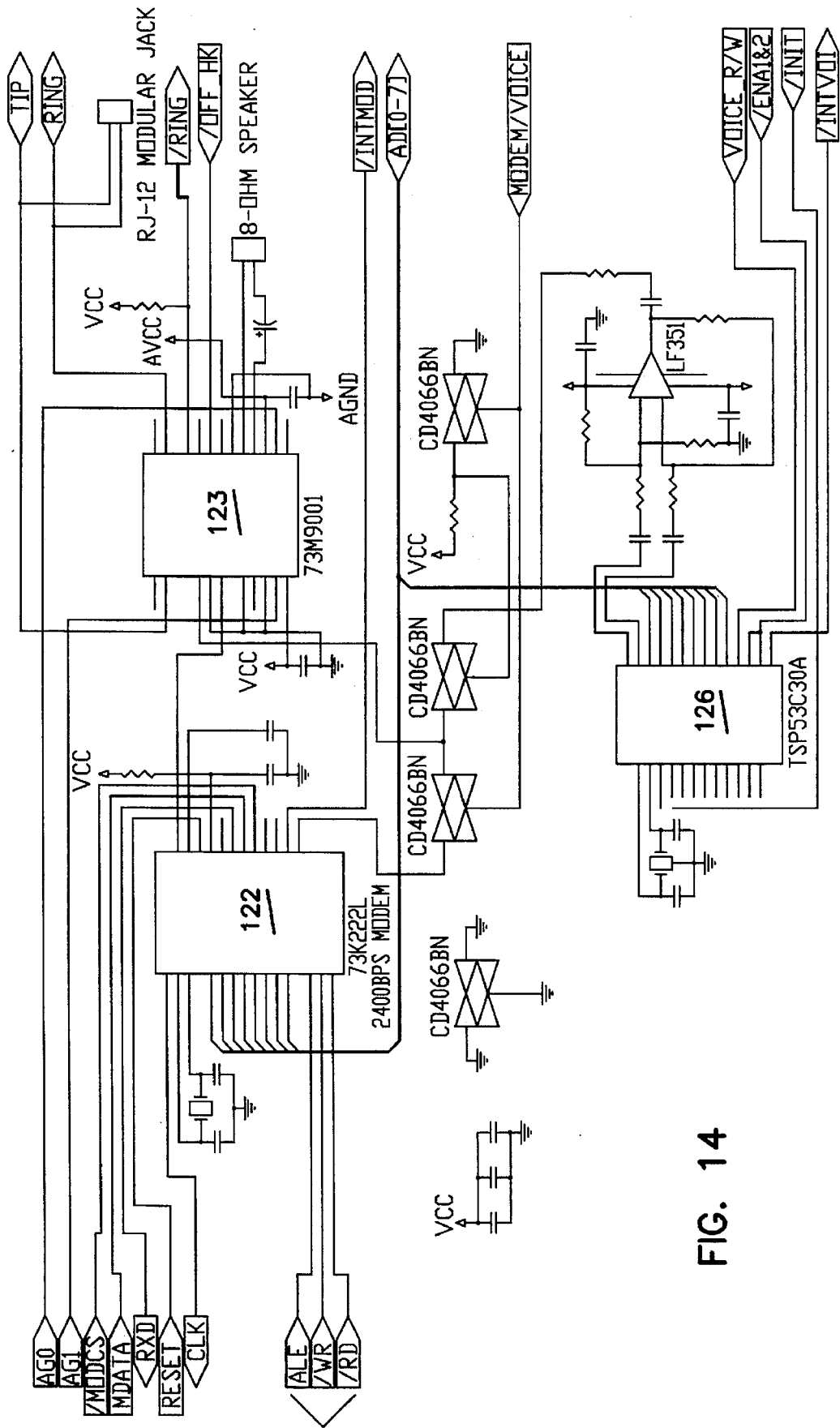

The components and interconnections illustrated in FIG. 14 are representative of the modem and voice synthesis integrated circuit component 137 illustrated in FIG. 12. Fluid metering information and verbal warn and status information processed by the microcontroller 119 may be communicated to a local speaker (not shown) in addition to a remotely located utility or fluid source managing entity by use of the modem 122 and telephone communication interface 123. It is noted that valve control signals, fluid metering system configuration parameters, and other information signals transmitted from a remote utility or fluid source managing entity are communicated to the fluid information unit 34 through modem 122 and telephone communication interface 123. Speech synthesis circuit 126 provides for the production and transmission of verbal messages produced by the microcontroller 119 which are transmitted over the communication line 54 through modem 122 and telephone communication interface 123.

Figure 15:
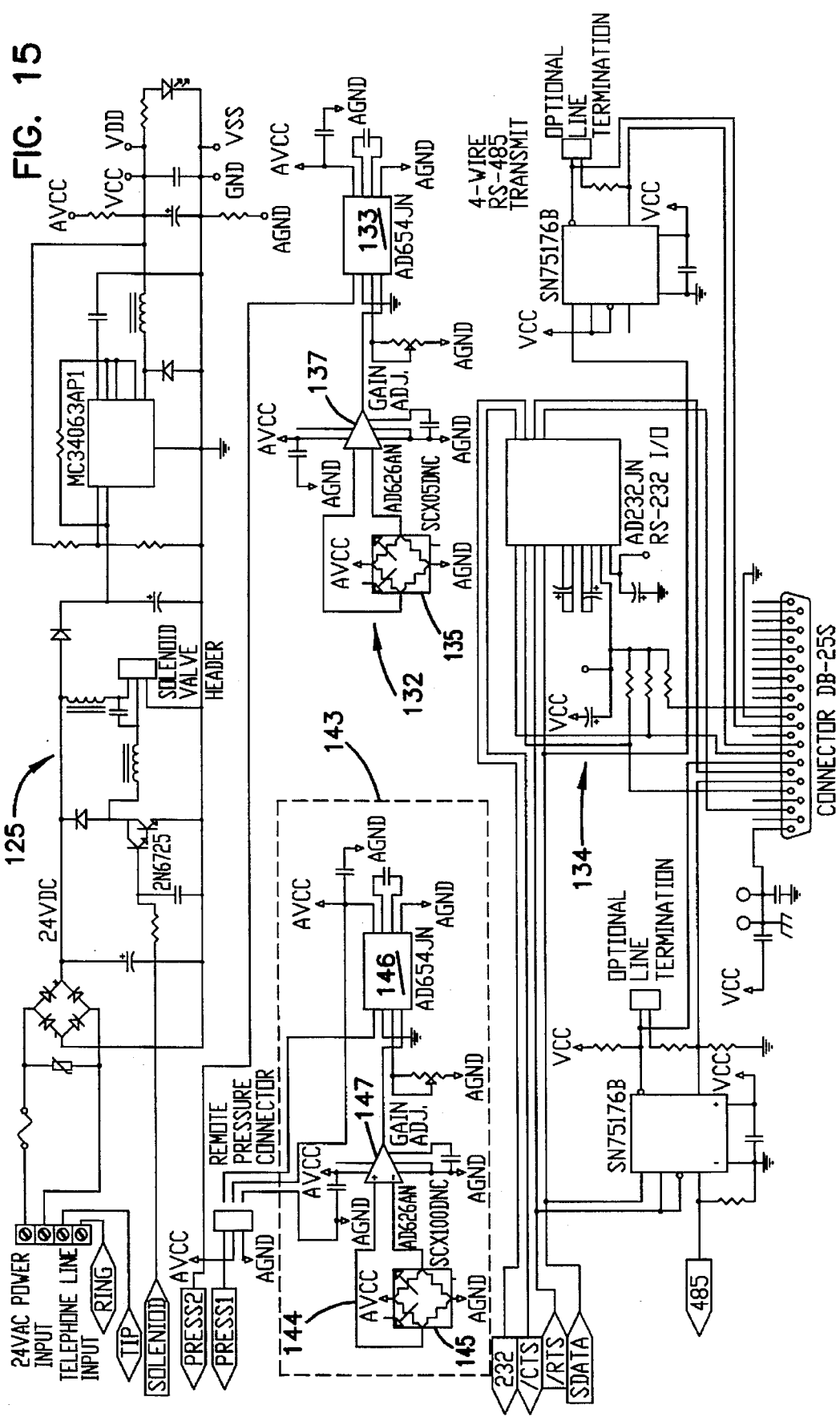

Referring now to FIG. 15, there is illustrated various components and circuitry which are housed within the fluid information unit 34, including a demand fluid pressure sensor 132, a valve control circuit 125, and input/output circuitry 134. The supply sub-circuit 143 represents circuitry that is provided within the fluid dispensing unit 30. The supply sub-circuit 143 includes a supply pressure sensor 144, signal processor 146, and input/output lines for communicating with the fluid information unit 34. The demand fluid pressure sensor 132 and supply pressure sensor 144 are of substantially similar construction, and respectively include a bridge-type pressure sensing element 135 and 145 coupled to an instrumentation operational amplifier (OP AMP) 137 and 147. The pressure sensing element 145 of the supply sub-circuit 143 senses the pressure $P_{SUPPLY}$ of the fluid in the supply pipe 28, and produces an output which is applied to the differential inputs of the instrumentation OP AMP 147. The voltage signal produced by the instrumentation OP AMP 147 is converted to a corresponding time-varying pressure signal by the voltage-to-frequency converter 146. The supply pressure signal produced by the voltage-to-frequency converter 146 is then transmitted to an input of the microcontroller 119.

Referring to the demand fluid pressure sensor 132, a bridge-type pressure sensing element 135 senses the pressure $P_{DEMAND}$ of the fluid in the demand pipe 32, and produces an output which is applied to the differential inputs of the instrumentation OP AMP 137. The demand pressure voltage signal produced by the instrumentation OP AMP 137 is converted to a corresponding time-varying demand pressure signal by the voltage-to-frequency converter 133. The demand pressure signal produced by the voltage-to-frequency converter 133 is then transmitted to an input of the microcontroller 119. As discussed previously, the microcontroller 119 performs a comparison between the demand pressure signal produced by the voltage-to-frequency converter 133 with a pre-established demand pressure signal stored in ROM 128 to produce a demand pressure error signal. The microcontroller 119 transmits the demand pressure error signal to the valve control circuit 125 which, in turn, actuates the controllable valve 142.

The microcontroller 119 also compares the supply pressure signal produced by the voltage-to-frequency converter 146 provided in the fluid dispensing unit 30 with the demand pressure signal produced by the voltage-to-frequency converter 133. The microcontroller 119 determines the pressure difference between the supply pressure and the demand pressure signals using these signals, and produces a pressure difference signal which is used when computing the volume of fluid flowing through the controllable valve 142.

In accordance with one embodiment, a characteristic flow rate factor associated with the controllable valve 142 is stored in the ROM 128. The microcontroller 119 computes the volume of fluid flowing through the controllable valve 142 by multiplying the supply and demand pressure difference signal by the characteristic flow rate factor. Alternatively, a characteristic duty cycle factor associated with a controllable valve 142 responsive to digital valve control signals is stored in the ROM 128 and accessed by the microcontroller 119 when computing the volume of fluid dispensed through the controllable valve 142.

As further illustrated in FIG. 15, the input/output circuitry 134 includes components to support communication of information over RS-232 and RS-485 communication lines. In the embodiment illustrated in FIG. 3, a fluid information unit 34 communicates with one or more demand control units 60, 64, and 68 over one or both of the RS-232 and RS-485 communication lines. These communication lines can further be utilized to form a local operating network (LON) to facilitate the communication of control and information signals throughout the fluid metering system. A local operating network suitable for facilitating communications within the fluid metering system is ESCHELON, which is an integrated hardware/software product produced by Motorola Corporation, under the direction of ESCHELON Corporation. Local operating networks are relatively inexpensive and provide control over multiple nodes at a controller cost of approximately $5.00 a node. It may be desirable to implement a local operating network within a distributed fluid metering system, such as that described previously with respect to FIG. 3, in order to manage fluid delivery through the fluid dispensing unit 30 and one or more independent demand control units 60, 64, and 68.

Figure 16:
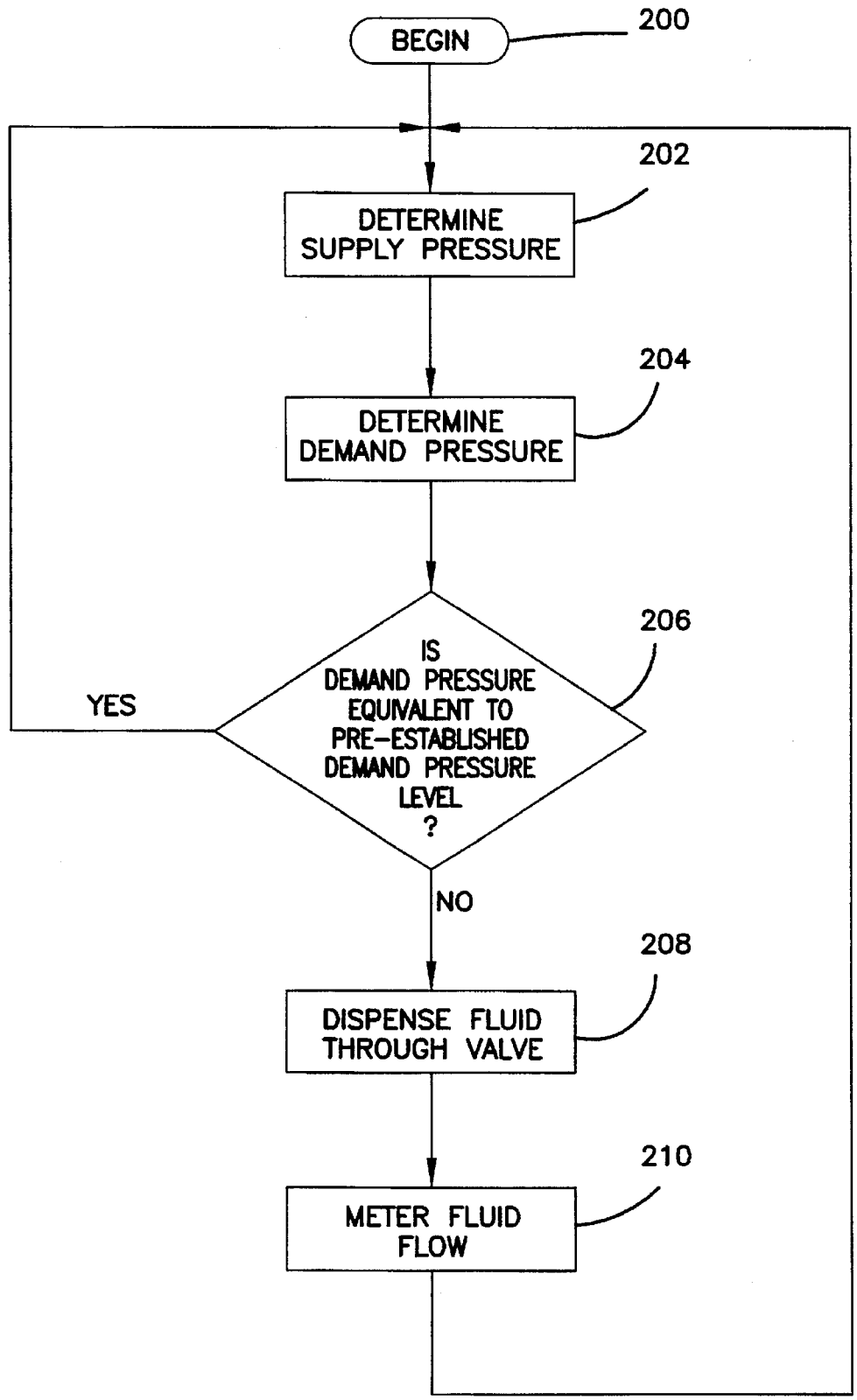
FIGS. 16–19 depict in flow diagram form a method for metering fluid in accordance with one embodiment of the present invention.

Turning now to FIGS. 16–19, there is illustrated in flow diagram form various steps for effecting a method of metering fluid flow in accordance with the present invention. In general terms, as is depicted in FIG. 16, one embodiment of a fluid metering method includes the steps of determining a supply pressure $P_{SUPPLY}$ of the fluid in the supply pipe 28 at step 202, and determining a demand fluid pressure $P_{DEMAND}$ in the demand pipe 32 at step 204. At decision step 206, the demand fluid pressure $P_{DEMAND}$ is compared to a pre-established demand pressure level $P_{ESTAB}$ and, if determined to be less than $P_{ESTAB}$, results in dispensing of fluid through the valve 142 at step 208 to equilibrate the demand fluid pressure with the pre-established demand pressure level. At step 210, the volume of fluid passed through the valve 142 to accomplish demand pressure equilibration is determined.

Figure 17:
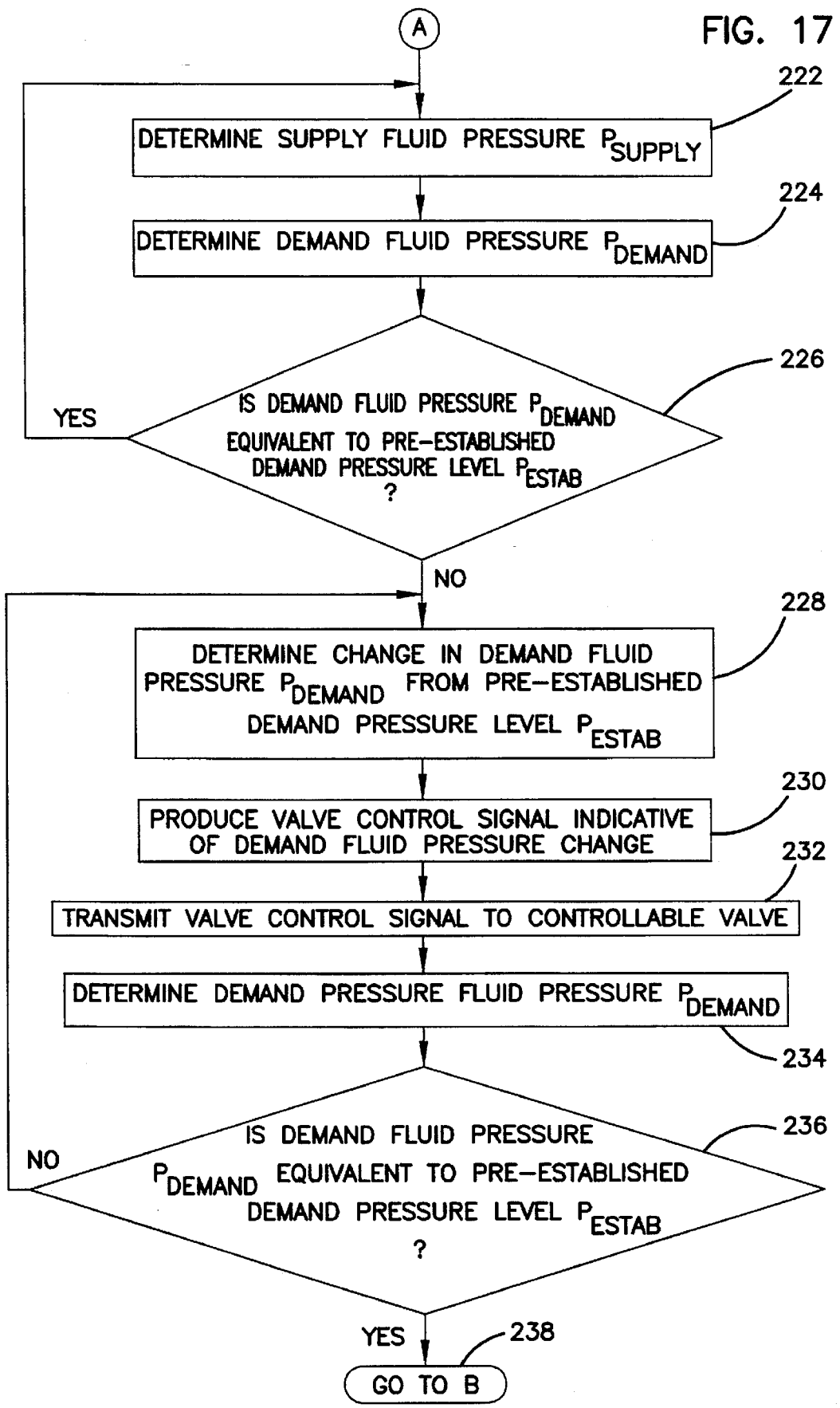
Figure 18:
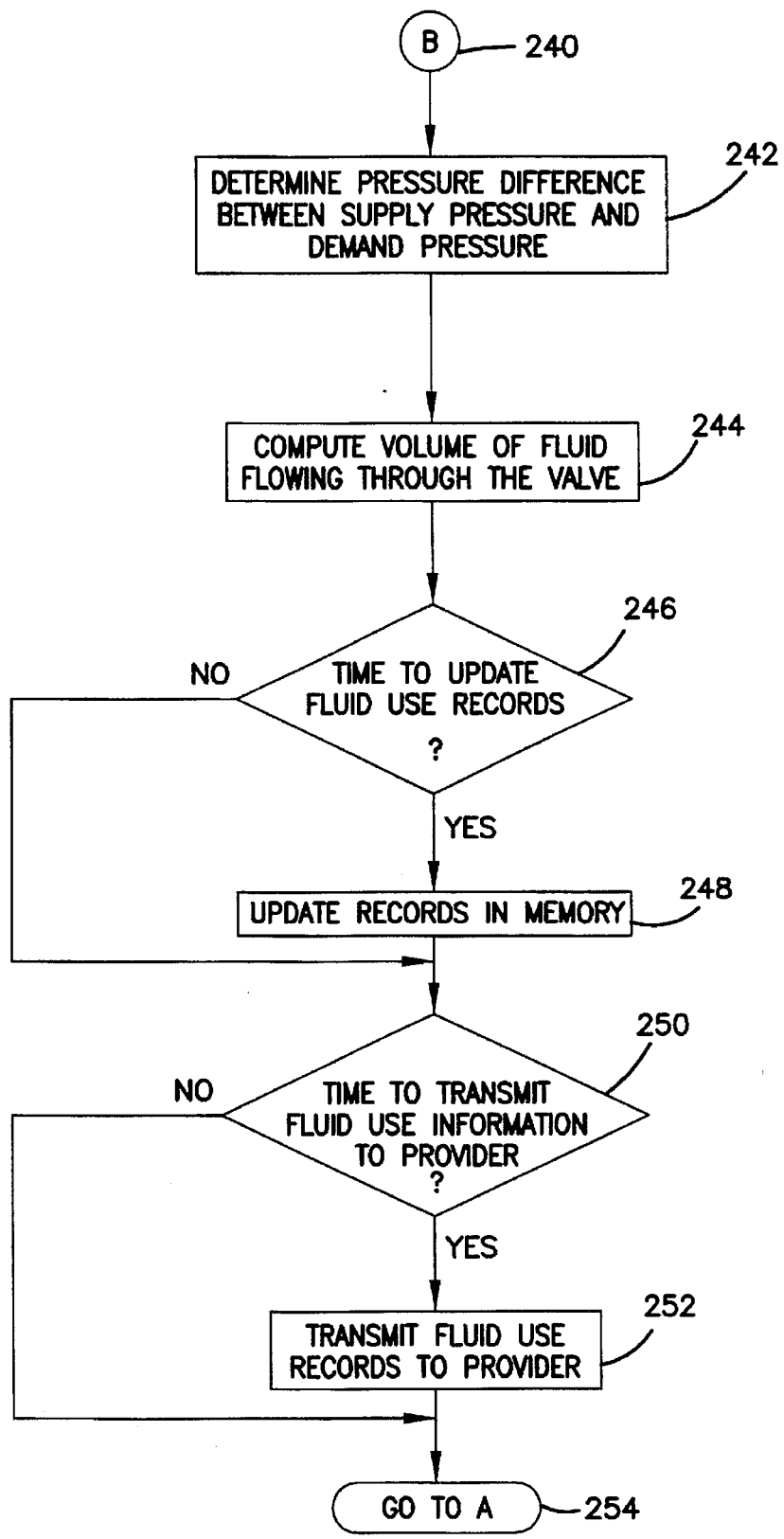

Referring to FIGS. 17 and 18, there is illustrated various detailed steps for effecting a method of metering fluid usage in accordance with another embodiment of the present invention. At step 222, a supply fluid pressure $P_{SUPPLY}$ is determined. The demand fluid pressure $P_{DEMAND}$ is determined at step 224 and compared to a pre-established demand pressure level $P_{ESTAB}$ at step 226. At step 228, the magnitude of the change in demand fluid pressure $P_{DEMAND}$ from the pre-established demand pressure level $P_{ESTAB}$ is determined and, at step 230, a valve control signal indicative of the demand fluid pressure change is produced. The valve control signal is transmitted to the controllable valve 142 at step 232 to actuate the valve by an appropriate amount between closed and open positions. The demand pressure $P_{DEMAND}$ is once again determined at step 234 and compared to the pre-established demand pressure level $P_{ESTAB}$ at step 236. Steps 228, 230, 232, and 234 are repeated if the demand fluid pressure $P_{DEMAND}$ is not equivalent to the pre-established demand pressure level $P_{ESTAB}$. It is to be understood that the pre-established demand pressure level $P_{ESTAB}$ may be represented as a range of pressure values, rather than a single pressure value, when making the comparison at steps 226 and 236.

Referring to FIG. 18, if the demand fluid pressure $P_{DEMAND}$ is equivalent to the pre-established demand pressure level $P_{ESTAB}$, as tested at decision step 236, the pressure difference between the supply fluid pressure $P_{SUPPLY}$ and the demand fluid pressure $P_{DEMAND}$ is determined at step 242. The volume of fluid flowing through the valve 142 is then computed at step 244. In one embodiment, the volume of fluid flowing through the valve 142 computed at step 244 is determined by multiplying the pressure difference determined at step 242 and a characteristic flow rate factor associated with a particular valve 142.

The characteristic flow rate factor of a particular valve represents a known volume of fluid flowable through the particular valve. Alternatively, the pressure difference computed at step 242 can be multiplied by a characteristic duty cycle factor for controllable valves responsive to digital valve control signals. The characteristic duty cycle factor is indicative of a known volume of fluid flowable through the valve when the plunger 149 cycles between the closed and open position. Another method for computing a volume of fluid flowing through the valve 142 at step 244 involves multiplying the pressure difference determined at step 242 by a time factor, where the time factor represents a duration of time during which a volume of fluid passes through the valve during a predetermined period of time. The time factor is correlated to a known volume of fluid flowable through the valve during the pre-determined period of time.

At step 246, the volumetric data computed at step 244 is preferably time and date stamped and stored in non-volatile memory in the fluid information unit 34 at the appropriate time as tested at step 246. At a pre-established scheduled time, as tested at step 250, the fluid usage data is transmitted to a provider or monitoring entity of the fluid source at step 252.

Figure 19:
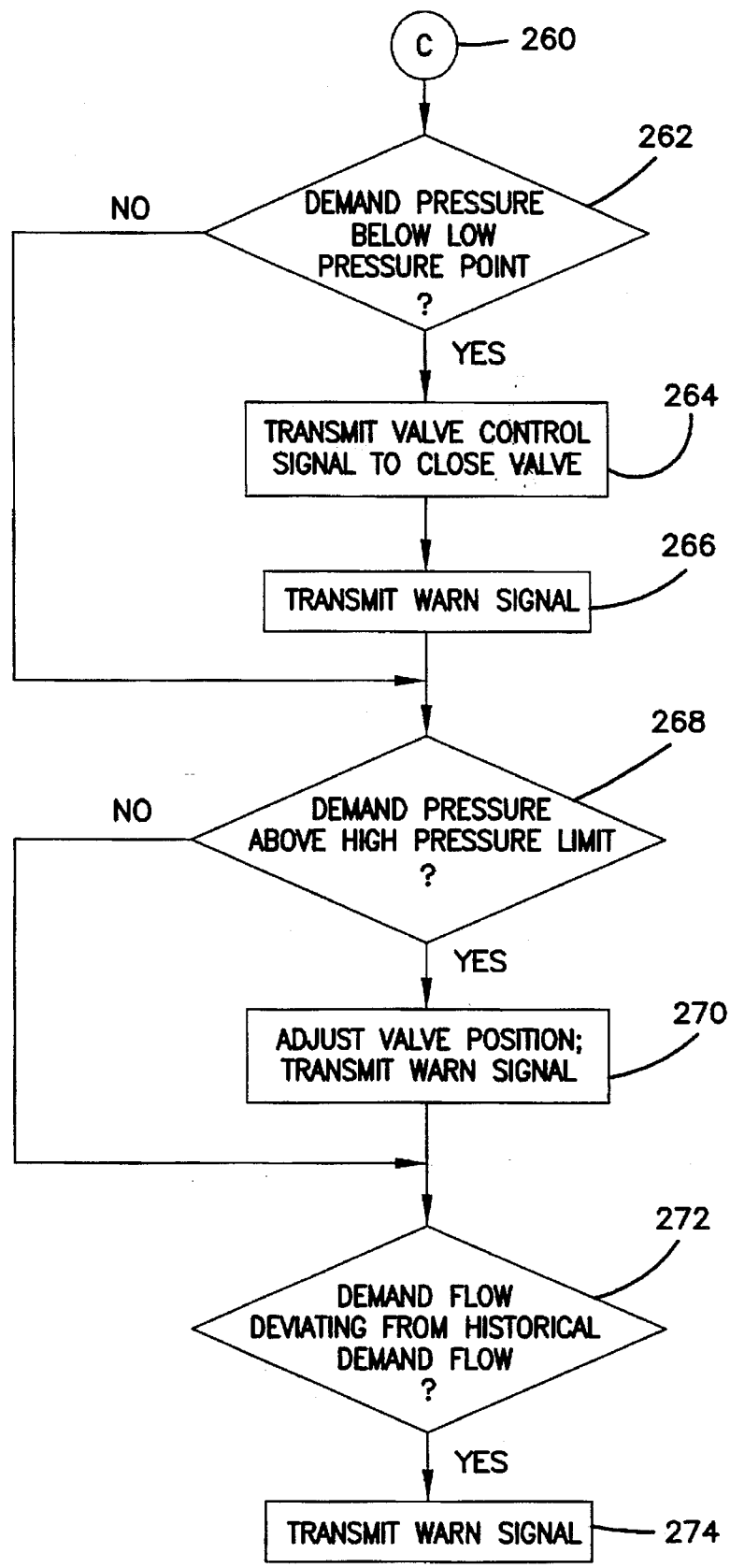

Referring now to FIG. 19, there is illustrated a number of steps associated with various safety functions which may be performed at any time during execution of the fluid metering method. At step 262, for example, if the demand fluid pressure $P_{DEMAND}$ is determined to fall below a low pressure limit, a valve control signal is produced and transmitted to close the valve, as indicated at step 264. A warn signal is produced and transmitted at step 266. The warn signal may be transmitted to a local alarm or speaker, and may also be transmitted over a communication line to a remote location, such as a provider or managing entity of the fluid source, utility, or fire department, for example. If, at step 268, the demand fluid pressure $P_{DEMAND}$ is determined to be above a high pressure limit, this condition may be indicative of a malfunctioning valve which may be remedied at step 270.

Additionally, a warn signal indicative of a high pressure condition may be transmitted locally and/or to a remote location. At step 272, if the demand flow deviates significantly from historical demand flow data, a warn signal may be produced and transmitted locally or to a remote location at step 274. It is noted that a significant deviation in current demand fluid flow from historical demand fluid flow data can be indicative of a leak in the fluid dispensing system or some other anomalous condition.

It will, of course, be understood that various modifications and additions can be made to the embodiments discussed hereinabove without departing from the scope or spirit of the present invention. For example, the metering methodology of the present invention can be applied to metering of electricity. In such a system, delivery of electricity to individual buildings and to individual electricity-expending appliances can be controlled and metered. The metering methodology can be employed to manage electricity delivered through a distributed power grid that services numerous buildings and users. Accordingly, the scope of the present invention should not be limited to the particular embodiments discussed above, but should be defined only by the claims set forth below and equivalence thereof.

What is claimed is:

1. A method for metering a volume of fluid flowing through a supply pipe and a demand pipe, comprising the steps of:

determining a supply fluid pressure of the fluid in the supply pipe;

determining a demand fluid pressure of the fluid in the demand pipe, the demand pipe being separated from the supply pipe by a valve;

cycling the valve between a closed position and an open position to regulate the fluid flowing through the valve in response to a change in the demand fluid pressure from a pre-established demand pressure level so as to maintain the demand fluid pressure at the pre-established demand pressure level;

determining a pressure difference between the supply fluid pressure and the demand fluid pressure; and determining a volume of the fluid flowing through the valve using the pressure difference and a duration of time during which the fluid is flowing through the valve.

2. The method of claim 1, including the steps of:

determining the volume of the fluid flowing through the valve over a pre-established period of time; and storing information corresponding to the volume of fluid flowing through the valve over the pre-established period of time.

3. The method of claim 1, including the further step of producing a demand pressure error signal representative of a pressure difference between the demand fluid pressure and the pre-established demand pressure level, wherein the step of cycling the valve includes the step of producing a valve control signal for causing the valve to actuate between the closed and open positions in response to the demand pressure error signal.

4. The method of claim 1, including the steps of:

computing a time duration during which the fluid is flowing through the valve for a plurality of valve cycles;

determining a change in the demand fluid pressure from the pre-established demand pressure level during each of the plurality of valve cycles; and determining the volume of the fluid flowing through the valve during each of the plurality of valve cycles using the change in demand fluid pressure and the time duration.

5. The method of claim 4, wherein:

the valve includes a variable orifice and exhibits a characteristic flow rate factor associated with a known volume of fluid flowable through the valve;

the valve cycling step includes modulating the variable orifice between the closed and open positions to regulate the fluid flowing through the valve in response to the change in the demand fluid pressure from the pre-established demand pressure level; and the volume determining step includes the step of determining the volume of the fluid flowing through the valve using the pressure difference and the characteristic flow rate factor of the valve.

6. The method of claim 4, wherein:

the valve exhibits a characteristic duty cycle factor associated with a known volume of fluid flowable through the valve; and the volume determining step includes the step of determining the volume of the fluid flowing through the valve using the pressure difference and the characteristic duty cycle factor of the valve.

7. The method of claim 1, including the steps of:

producing a demand pressure error signal representative of a pressure difference between the demand fluid pressure and the pre-established demand pressure level during each of a plurality of valve cycles; and producing a valve control signal for causing the valve to cycle between the closed and open positions in response to the demand pressure error signal.

8. The method of claim 7, wherein the step of cycling the valve includes the step of producing a pulse-width-modulated valve control signal proportional to the demand pressure error signal for causing the valve to cycle between the closed and open positions in response to the demand pressure error signal.

9. The method of claim 1, including the step of producing a warn signal in response to one of the supply and demand fluid pressures deviating from pre-established nominal supply and demand pressure levels, respectively.

10. The method of claim 9, including the steps of:
monitoring the supply fluid pressure and the demand fluid pressure; and
closing the valve in response to the warn signal.

11. The method of claim 9, including the steps of:
transmitting the warn signal over a communication channel;
receiving a valve control signal over the communication channel in response to the warn signal; and
closing the valve in response to the valve control signal.

12. The method of claim 1, including the steps of:
determining a demand flow rate of the fluid flowing through the valve using a pressure difference between the supply and demand fluid pressures and a duration of time during which the fluid is flowing through the valve;
recording the demand flow rate over a pre-established period of time; and
producing a warn signal in response to a change in the demand flow rate outside of a range of nominal demand flow rates associated with the pre-established period of time.

13. A method for measuring a volume of fluid flowing through a valve disposed between a demand pipe and a supply pipe, comprising the steps of:
determining a pressure difference between a supply fluid pressure in the supply pipe and a demand fluid pressure in the demand pipe;
dispensing the fluid through the valve in response to a change in the demand fluid pressure from a pre-established demand pressure level so as to maintain the demand fluid pressure at a pre-established demand pressure level; and
metering a volume of the fluid dispensed through the valve using the pressure difference between the supply and demand fluid pressures and a characteristic flow rate factor associated with a known volume of fluid flowable through the valve.

14. The method of claim 13, wherein:
each of a plurality of the valves is disposed between a corresponding one of a plurality of the demand pipes and the supply pipe;
the dispensing step includes the step of dispensing the fluid through the plurality of valves in response to a change in the demand fluid pressure in the corresponding plurality of demand pipes from the pre-established demand pressure level so as to maintain the demand fluid pressure in the plurality of demand pipes at the pre-established demand pressure level; and
metering the volume of the fluid dispensed through each of the plurality of valves.

15. The method of claim 14, including the step of controlling dispensing of the fluid through selected ones of the plurality of valves.

16. The method of claim 13, wherein the dispensing step includes the step of cycling the valve in response to the change in the demand fluid pressure from the pre-established demand pressure level.

17. The method of claim 13, wherein the dispensing step includes the step of controlling the valve between a closed and an open position in response to a demand pressure error signal representative of a pressure difference between the demand fluid pressure and the pre-established demand pressure level.

18. The method of claim 13, wherein:
the dispensing step includes the step of cycling the valve between a closed and an open position; and
the metering step includes the steps of:
computing a time duration during which the fluid is flowing through the valve for a plurality of valve cycles;
determining a change in the demand fluid pressure from the pre-established demand pressure level during each of the plurality of valve cycles; and
determining the volume of the fluid flowing through the valve during each of the plurality of valve cycles using the change in the demand fluid pressure from the pre-established demand pressure level and the time duration.

19. The method of claim 13, including the steps of:
producing a warn signal in response to one of the supply and demand fluid pressures deviating from a pre-established nominal supply and demand pressure levels, respectively; and
closing the valve in response to the warn signal.

20. An apparatus for metering a fluid flowing through a supply pipe and a demand pipe, comprising:
a fluid dispensing unit including a controllable valve coupled to the supply pipe and a supply pressure sensor for sensing a supply pressure of the fluid in the supply pipe; and
a fluid information unit comprising:
a demand pressure sensor for sensing a demand fluid pressure of the fluid in the demand pipe;
means for communicating with the supply pressure sensor and the controllable valve of the fluid dispensing unit; and
a processor, coupled to the supply and demand pressure sensors and the controllable valve, for controlling the controllable valve between a closed and an open position to regulate the fluid flowing through the controllable valve in response to a change in the demand fluid pressure from a pre-established demand pressure level so as to maintain the demand fluid pressure at the pre-established demand pressure level, and for computing a volume of the fluid flowing through the controllable valve.

21. The apparatus of claim 20, comprising a valve control circuit coupled to the processor and the controllable valve, wherein:
the processor produces a demand pressure error signal in response to a difference between the demand fluid pressure and the pre-established demand pressure level; and
the valve control circuit produces a valve control signal proportion to the demand pressure error signal to control the controllable valve between the closed and open positions.

22. The apparatus of claim 21, wherein the valve control circuit produces valve control signal pulses for cycling the valve between the closed and open positions in response to the demand pressure error signal.

23. The apparatus of claim 21, wherein the valve control circuit produces an analog valve control signal for controlling the valve between the closed and open positions in response to the demand pressure error signal.

24. The apparatus of claim 20, wherein the demand and supply pressure sensors each comprise a voltage-to-frequency converter for converting pressure sensor voltage signals to corresponding time-varying pressure sensor signals.

25. The apparatus of claim 20, comprising a service conduit coupling the fluid information unit with the fluid dispensing unit, the service conduit including:
   a fluid-carrying pipe;
   an electrically conductive material disposed on the fluid-carrying pipe for carrying high-voltage electric power;
   means for communicating low voltage power and information signals between the fluid information and dispensing units; and
   a protective outer layer.

26. The apparatus of claim 20, comprising a modem coupled to the processor for communicating fluid metering information to a communication line.

27. The apparatus of claim 20, comprising a plurality of demand control units coupled between a corresponding plurality of fluid-expending appliances and the demand pipe, wherein each of the plurality of demand control units comprises:

a controllable appliance valve for controlling fluid flow between the demand control unit and the appliance; and
   a first pressure sensor for sensing fluid pressure in a pipe disposed between the demand control unit and the fluid-expending appliance.

28. The apparatus of claim 27, further comprising a second pressure sensor for sensing fluid pressure in the demand pipe, wherein a volume of fluid flowing through the controllable appliance valve of the demand control unit is determined by the processor using the pressure difference between the supply and demand fluid pressures and a characteristic flow rate factor associated with a known volume of fluid flowable through the controllable appliance valve.

29. The apparatus of claim 27, wherein the processor communicates with each of the plurality of demand control units to manage fluid flow through the plurality of demand control units.

* * * * *